US010521866B2

(12) United States Patent
Lo Faro

(10) Patent No.: US 10,521,866 B2
(45) Date of Patent: Dec. 31, 2019

(54) SYSTEMS AND METHODS FOR ASSOCIATING RELATED MERCHANTS

(71) Applicant: MasterCard International Incorporated, New York, NY (US)

(72) Inventor: Walter F. Lo Faro, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 860 days.

(21) Appl. No.: 14/054,340

(22) Filed: Oct. 15, 2013

(65) Prior Publication Data

US 2015/0106244 A1  Apr. 16, 2015

(51) Int. Cl.
*G06Q 40/00* (2012.01)

(52) U.S. Cl.
CPC .................. *G06Q 40/12* (2013.12)

(58) Field of Classification Search
CPC .................................................... G06Q 40/12
See application file for complete search history.

(56) References Cited

U.S. PATENT DOCUMENTS

| 5,262,941 A | 11/1993 | Saladin et al. |
| 5,517,021 A | 5/1996 | Kaufman et al. |
| 6,006,221 A | 12/1999 | Liddy et al. |
| 6,026,397 A | 2/2000 | Sheppard |
| 6,073,095 A | 6/2000 | Dharanipragada et al. |
| 6,108,004 A | 8/2000 | Medl |
| 6,167,369 A | 12/2000 | Schulze |
| 6,952,570 B2 | 10/2005 | Nagayasu |
| 7,206,303 B2 | 4/2007 | Karas et al. |

(Continued)

FOREIGN PATENT DOCUMENTS

| JP | 2000357204 A | 12/2000 |
| JP | 2002083110 A | 3/2002 |

(Continued)

OTHER PUBLICATIONS

Zhu, Hongwei, Michael D. Siegel, and Stuart E. Madnick. "Information aggregation—a value-added e-service." Proc. Of the International Conference on Technology, Policy, and Innovation: Critical Infrastructures. 2001.*

*Primary Examiner* — Asfand M Sheikh
(74) *Attorney, Agent, or Firm* — Armstrong Teasdale LLP

(57) ABSTRACT

A computer-implemented method for associating a merchant with an aggregate merchant uses a computing device having a processor and a memory. The method includes identifying an association rule for the aggregate merchant, including one or more antecedents. Each antecedent includes a model value for the antecedent associated with the aggregate merchant. The method also includes identifying one or more merchant data values associated with the merchant. Each of the one or more merchant data values correspond to one of the one or more antecedents. The method further includes applying the association rule to the one or more merchant data values by comparing the model value for each antecedent with a merchant data value associated with the corresponding antecedent, thereby generating a confidence score for the merchant. The confidence score represents a likelihood the merchant is associated with the aggregate merchant. The method also includes outputting the confidence score.

21 Claims, 11 Drawing Sheets

(56) References Cited

U.S. PATENT DOCUMENTS

| | | | |
|---|---|---|---|
| 7,216,073 B2 | 5/2007 | Lavi et al. | |
| 7,290,048 B1 | 10/2007 | Barnett et al. | |
| 7,363,308 B2 | 4/2008 | Dillon et al. | |
| 7,925,652 B2 | 4/2011 | Merz et al. | |
| 8,458,071 B2 | 6/2013 | Martin et al. | |
| 8,706,557 B1 * | 4/2014 | Tavares | G06Q 20/204 |
| | | | 705/16 |
| 9,947,055 B1 * | 4/2018 | Roumeliotis | G06Q 40/12 |
| 2002/0099536 A1 | 7/2002 | Bordner et al. | |
| 2002/0161647 A1 | 10/2002 | Gailey et al. | |
| 2002/0184170 A1 * | 12/2002 | Gilbert | G06Q 30/06 |
| | | | 706/20 |
| 2003/0033228 A1 | 2/2003 | Bosworth-Davies et al. | |
| 2003/0088562 A1 | 5/2003 | Dillon et al. | |
| 2003/0158844 A1 | 8/2003 | Kramer et al. | |
| 2003/0177087 A1 | 9/2003 | Lawrence | |
| 2004/0054625 A1 * | 3/2004 | Kellogg | G06Q 20/04 |
| | | | 705/41 |
| 2004/0162778 A1 | 8/2004 | Kramer et al. | |
| 2004/0215599 A1 | 10/2004 | Apps et al. | |
| 2004/0236692 A1 | 11/2004 | Sellen et al. | |
| 2005/0159996 A1 | 7/2005 | Lazarus et al. | |
| 2006/0004595 A1 * | 1/2006 | Rowland | G06Q 10/06 |
| | | | 705/1.1 |
| 2006/0101048 A1 | 5/2006 | Mazzagatti et al. | |
| 2006/0277130 A1 | 12/2006 | Harmon | |
| 2007/0005589 A1 | 1/2007 | Gollapudi | |
| 2007/0040918 A1 | 2/2007 | Kondo et al. | |
| 2007/0061259 A1 | 3/2007 | Zoldi et al. | |
| 2007/0192872 A1 | 8/2007 | Rhoads et al. | |
| 2007/0276841 A1 | 11/2007 | Rhoads et al. | |
| 2007/0276928 A1 | 11/2007 | Rhoads et al. | |
| 2007/0288414 A1 | 12/2007 | Barajas et al. | |
| 2008/0031535 A1 | 2/2008 | Shi et al. | |
| 2008/0082373 A1 | 4/2008 | Durocher et al. | |
| 2008/0172264 A1 | 7/2008 | Hoefelmeyer | |
| 2009/0125386 A1 | 5/2009 | Willison et al. | |
| 2009/0171759 A1 | 7/2009 | McGeehan | |
| 2011/0022628 A1 | 1/2011 | Kramer et al. | |
| 2013/0018781 A1 | 1/2013 | Prada et al. | |
| 2013/0262313 A1 | 10/2013 | Martin et al. | |
| 2014/0358772 A1 * | 12/2014 | Howe | G06Q 20/08 |
| | | | 705/39 |
| 2015/0172327 A1 * | 6/2015 | Wansley | G06F 3/04842 |
| | | | 715/753 |

FOREIGN PATENT DOCUMENTS

| | | |
|---|---|---|
| JP | 2002297884 A | 10/2002 |
| JP | 2003323538 A | 11/2003 |
| JP | 2005107688 A | 4/2005 |

* cited by examiner

SYSTEMS AND METHODS FOR ASSOCIATING RELATED MERCHANTS

BACKGROUND OF THE DISCLOSURE

This disclosure relates generally to aggregating merchant transaction information and, more particularly, to a system and method for associating related merchants with a parent "aggregate merchant" to facilitate the aggregation of transaction data across related merchants.

A processor of financial transactions, such as payment transactions, processes transactions between many types of entities, such as personal consumers (e.g., individuals, or "cardholders") and merchants (e.g., the businesses selling those goods and services). Some merchants, such as a retail outlet store or a restaurant, process transactions involving their consumers using a point-of-sale ("POS") device connected to a payment network. During a typical payment card transaction, the cardholder identifies his/her payment account, such as a credit card account, by swiping their payment card through the POS device. The merchant is identified through the use of pre-configured merchant information stored within the POS device. Thus, when the POS device interacts with the payment network to perform the transaction, both the consumer data from the payment card and the merchant data from the POS device are sent through to the payment network for processing.

Payment networks receive transactions involving many types of merchants. Some businesses are conventional small-business operators, such as a single-store restaurant (i.e., a single merchant at a single location). Other businesses are franchise businesses with many franchisees, each of which may operate one or more storefronts (i.e., multiple merchants/locations). Still other businesses are corporate businesses which may operate many storefronts themselves (i.e., multiple merchants/locations). A business with multiple merchants may be thought of, and analyzed as, an aggregate merchant. It would be beneficial to be able to aggregate multiple related merchants to a single aggregate merchant.

BRIEF DESCRIPTION OF THE DISCLOSURE

In one aspect, a computer-implemented method for associating a merchant with an aggregate merchant is provided. The method uses a computing device having a processor and a memory. The method includes identifying an association rule for the aggregate merchant. The association rule includes one or more antecedents. Each antecedent includes a model value for the antecedent associated with the aggregate merchant. The method also includes identifying one or more merchant data values associated with the merchant. Each of the one or more merchant data values correspond to one of the one or more antecedents. The method further includes applying, by the computing device, the association rule to the one or more merchant data values by comparing the model value for each antecedent with a merchant data value associated with the corresponding antecedent, thereby generating a confidence score for the merchant. The confidence score represents a likelihood the merchant is associated with the aggregate merchant. The method also includes outputting the confidence score.

In another aspect, a computing device for associating a merchant with an aggregate merchant is provided. The computer device includes a processor communicatively coupled to a memory. The computing device is programmed to identify, within the memory, an association rule for the aggregate merchant. The association rule includes one or more antecedents. Each antecedent includes a model value for the antecedent associated with the aggregate merchant. The computing device is also programmed to identify, within the memory, one or more merchant data values associated with the merchant. Each of the one or more merchant data values corresponding to one of the one or more antecedents. The computing device is further programmed to apply the association rule to the one or more merchant data values by comparing the model value for each antecedent with a merchant data value associated with the corresponding antecedent, thereby generating a confidence score for the merchant. The confidence score represents a likelihood the merchant is associated with the aggregate merchant. The computing device is also programmed to output the confidence score.

In yet another aspect, at least one non-transitory computer-readable storage media having computer-executable instructions embodied thereon is provided. When executed by at least one processor, the computer-executable instructions cause the processor to identify, within the memory, an association rule for an aggregate merchant. The association rule includes one or more antecedents. Each antecedent includes a model value for the antecedent associated with the aggregate merchant. The computer-executable instructions also cause the processor to identify, within the memory, one or more merchant data values associated with a merchant. Each of the one or more merchant data values correspond to one of the one or more antecedents. The computer-executable instructions further cause the processor to apply the association rule to the one or more merchant data values by comparing the model value for each antecedent with a merchant data value associated with the corresponding antecedent, thereby generating a confidence score for the merchant. The confidence score representing a likelihood the merchant is associated with the aggregate merchant. The computer-executable instructions also cause the processor to output the confidence score.

BRIEF DESCRIPTION OF THE DRAWINGS

FIG. 1 is a flowchart illustrating a conventional transaction process involving ordinary payment-by-card transactions.

FIG. 2 is a simplified block diagram of an example aggregation computing system including a plurality of computer devices connected in communication in accordance with the present disclosure.

FIG. 3 is an expanded block diagram of an example aggregation computing system having a server architecture and computer devices in accordance with one embodiment of the present disclosure.

FIG. 4 illustrates an example configuration of a user system operated by a user, such as the client devices shown in FIGS. 2 and 3.

FIG. 5 illustrates an example configuration of a server system such as server systems shown in FIGS. 2 and 3.

FIG. 6 illustrates example sets of data used by the aggregation system shown in FIG. 2 to manage associations of merchants to aggregate merchants.

FIG. 7 illustrates example data sets used by the aggregation system shown in FIG. 1 during merchant association analysis.

FIG. 8 is an example method for associating related merchants implemented using the aggregation computing system shown in FIGS. 2 and 3.

FIG. 9 illustrates additional steps for associating related merchants that, in some embodiments, are used for applying the association rule to the merchant data value as shown in FIG. 8.

FIG. 10 is an example method for building rules and sets of rules that may be used to associate related merchants in accordance with the present disclosure.

FIG. 11 shows an example configuration of a database in communication with the aggregation computing systems shown in FIGS. 2 and 3.

DETAILED DESCRIPTION OF THE DISCLOSURE

Figure 1:
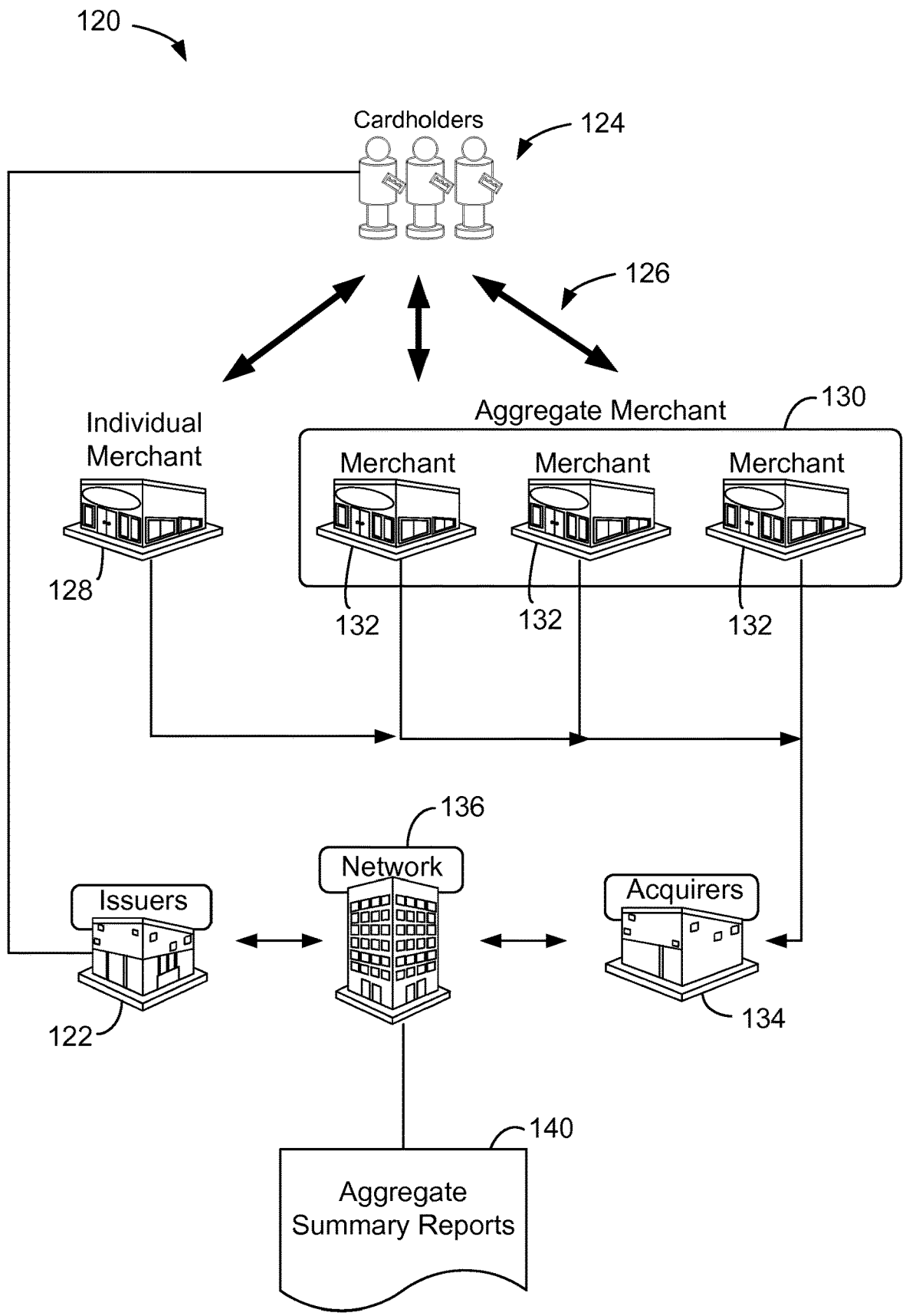
FIGS. 1-11 show example embodiments of the methods and systems described herein.

The methods and systems described herein include systems and methods for associating individual merchants, such as an individual business store or location, with a related "aggregate merchant," such as a parent company of that individual store/location. The methods and systems described herein facilitate discovering and maintaining these individual merchant to aggregate merchant relationships so that, for example, transaction sales in a payment network may be computed for an aggregate merchant rather than for single individual stores.

In one embodiment, an administrator or user of the system builds an "association rule" for a particular aggregate merchant. The rule includes several elements of data, or "antecedents", that help identify the aggregate merchant, such as a business name, or an acquiring ID (a code used internally by an acquirer for merchant identification) of the aggregate merchant. Merchant data is collected for various merchants and compared to the data in the rule. This merchant data may be generated from merchant transaction data, such as when consumers purchase goods or services from a Merchant A, who then transmits transaction data to a payment network for authorization and other processing. The system applies the rule to the merchant data for Merchant A, comparing a model value for the antecedent (from the rule) with a corresponding value for Merchant A. A score is generated that represents an approximation of how likely it is that Merchant A is associated with the aggregate merchant.

For example, presume an aggregate merchant "Wally's Trout Shop" has several store locations, each of which has a point-of-sale ("POS") device used to process consumer payment card transactions with a payment network. Most of Wally's POS devices are configured to identify their transactions under a merchant Doing Business As ("DBA") name of "WALLYSTROUTSHOP". However, each POS device may have slightly different information configured within it, and they may not be properly configured with identical names. Presume Wally opens a new store location, and the system then receives a transaction from the new store/location, but the new POS device at the new location identifies itself with a merchant DBA name of "WALLYS-FISHSHOP". This system may not yet know that this individual merchant (i.e., the new POS device at the new store/location identifying itself as "WALLYSFISHSHOP") is actually associated with the aggregate merchant known as "Wally's Trout Shop" (i.e., the location known as "WALLY-SFISHSHOP" is what is sometimes called an "orphaned merchant"). As such, when other computations within the system wish to examine transactions for all of Wally's locations, the system will exclude the new location because it is not yet associated with the aggregate merchant.

An administrator may create a rule that helps identify merchants that are dissociated with a particular aggregate merchant. The rule may include, for example, a merchant DBA name of "WALLYSTROUTSHOP", which is configured as the "model data" for Wally's store locations. The system compares the merchant DBA name of the rule (i.e., "WALLYSTROUTSHOP") with the merchant data from the individual store (i.e., "WALLYSFISHSHOP") to evaluate potential association. The system may also compare the rule with other merchants, such as another (properly unrelated) merchant that is using "FISHEMPORIUM" as their DBA name. The system generates comparison values for each of these merchants based on the rule. The merchants with information more similar to the rule are scored higher than merchants that are less similar to the rule. An auditor, for example, may then examine the resulting scores for each merchant and use that data to decide which merchants are actually associated with the Wally's Fish Shop.

A technical effect of the systems and processes described herein include at least one of (a) identifying an association rule for an aggregate merchant that includes one or more antecedents, where each antecedent includes a model value for the antecedent associated with the aggregate merchant; (b) identifying one or more merchant data values associated with a merchant, the one or more merchant data values each corresponding to an antecedent of the one or more antecedents; (c) applying the association rule to the one or more merchant data values by comparing the model value for each antecedent with a merchant data value associated with the corresponding antecedent, thereby generating a confidence score for the merchant, the confidence score representing a likelihood of association between the merchant and the aggregate merchant; and (d) outputting the confidence score.

In addition, the systems and processes described herein may include (e) applying the association rule to a plurality of merchants, thereby generating a plurality of confidence scores, wherein applying the association rule includes generating a plurality of confidence sub-values, each confidence sub-value corresponding to an antecedent of the one or more antecedents and combining the plurality of confidence sub-values to generate the confidence score. Identifying an association rule may include identifying the association rule including one or more antecedents, each antecedent further including an associated weight, weighing each sub-value of the plurality of sub-values with the associated weight prior to combining, and/or identifying an association rule that includes one or more antecedents, each antecedent having an associated comparison type. Further, applying the association rule may include comparing based at least in part on the comparison type and/or generating n-gram representations for the model value of an antecedent and a corresponding merchant data value.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the present disclosure by way of example and not by way of limitation. It is contemplated that the disclosure has general application to transaction analysis.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a flowchart 120 illustrating a conventional transaction process involving ordinary payment-by-card transactions. Embodiments described herein may relate to a payment network 136, such as a payment card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.). In some embodiments, payment network 136 is an interchange network.

In a typical payment network 136, financial institutions (i.e., "issuers") 122 issues transaction cards, such as credit cards and/or debit cards, to consumers or cardholders 124. Cardholders 124 use the transaction cards to tender payment for purchases 126 of goods and services from merchants, such as an individual merchant 128 (e.g., an independently owned restaurant) or a merchant 132 (e.g., a particular McDonalds® store) that is a part of a parent business entity or "aggregate merchant" 130 (e.g., McDonalds Corporation®) (McDonalds Corporation, Wilmington, Del.).

When cardholders 124 tender payment for purchases 126 with a transaction card, merchants 128 and 132 request authorization from a merchant bank or "acquirer" 134 for the amount of the purchase. The request may be performed over the telephone, but is usually performed through the use of a point-of-sale terminal (not shown in FIG. 1), which reads cardholder's 124 account information from a magnetic stripe, a chip, or embossed characters on the transaction card and communicates electronically with the transaction processing computers of merchant bank 134. Alternatively, merchant bank 134 may authorize a third party to perform transaction processing on its behalf. In this case, the point-of-sale terminal will be configured to communicate with the third party. Such a third party is usually called a "merchant processor," an "acquiring processor," or a "third party processor."

Using payment network 136 (also sometimes referred to as an interchange network), computers of merchant banks 134 or merchant processors will communicate with computers of issuers 122 to determine whether cardholder's 124 accounts are in good standing and whether the purchase is covered by cardholder's 124 available credit line. Based on these determinations, the request for authorization will be declined or accepted. If the request is accepted, an authorization code is issued to merchant 128 and 132.

When a request for authorization is accepted, the available credit line of cardholder's 124 account is decreased. Normally, a charge for a payment card transaction is not posted immediately to cardholder's 124 account because bankcard associations, such as MasterCard International Incorporated®, have promulgated rules that do not allow merchants 128 and 132 to charge, or "capture," a transaction until goods are shipped or services are delivered. However, with respect to at least some debit card transactions, a charge may be posted at the time of the transaction. When merchants 128 and 132 ship or deliver the goods or services, merchants 128 and 132 capture the transaction by, for example, appropriate data entry procedures on the point-of-sale terminal. This may include bundling of approved transactions daily for standard retail purchases. If cardholder 124 cancels a transaction before it is captured, a "void" is generated. If cardholders 124 return goods after the transaction has been captured, a "credit" is generated. Payment network 136 and/or issuer banks 122 store the transaction card information, such as a type of merchant, amount of purchase, date of purchase, in a database (not shown in FIG. 1).

After a purchase has been made, a clearing process occurs to transfer additional transaction data related to the purchase among the parties to the transaction, such as merchant banks 134, payment network 136, and issuer banks 122. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 128 and 132, merchant bank 134, and issuer bank 122. Settlement refers to the transfer of financial data or funds among merchant's 128 and 132 accounts, merchant bank 134, and issuer bank 122 related to the transaction. Usually, transactions are captured and accumulated into a "batch," which is settled as a group. More specifically, a transaction is typically settled between issuer banks 122 and payment network 136, and then between payment network 136 and merchant banks 134, and then between merchant banks 134 and merchants 128 and 132.

Further, in the example embodiment, payment network 136 aggregates transaction data to generate, for example, aggregate summary reports 140 for aggregate merchants 130. To facilitate aggregation of transaction data, payment network 136 maintains relationship information for each merchant 128 and 132. Some information is gathered from the transaction data transmitted from the merchant 128 and 132 POS devices. For example, in some embodiments, a POS device is configured with an "Acquiring ID" during installation and configuration. The acquiring ID is an identifier, such as a unique integer, that assists in uniquely identifying a particular POS device as against other POS devices of an acquirer. This acquiring ID is transmitted along with other transaction data for every transaction that is processed. As such, each transaction may be associated with a particular merchant 128 and 132, but each merchant 128 and 132 may or may not be associated with an aggregate merchant 130.

To associate transactions with aggregate merchants 130, in some embodiments, each merchant 132 that has an affiliation with a parent entity is associated with the appropriate aggregate merchant 130. Such associations may be stored in a database such that interchange network 136 maintains the aggregation relationships over time. Thus, in this example embodiment, transactions are associated with merchants 128 and 132, and any transactions of merchants 132 are associated with aggregate merchants 130, allowing aggregation of transactions at the level of aggregate merchants 130. Some individual merchants 128 do not have a relationship with an aggregate merchant 130, and are thus no aggregation association is established and maintained. As used herein, the term "aggregate merchant" is used to refer generally and broadly to some categorization or association of merchants and, in specific embodiments, to either the parent business entity, or the data structure within a computing system (not shown in FIG. 1) that represents the parent business entity, or to both. Similarly, the term "merchant" is used to refer to either a single business location, or to the data structure within the computing system that represents the business location, or to both.

In some known systems, the establishing and maintaining of merchant 132 to aggregate merchant 130 relationships requires human involvement to correlate the relationships. In the example embodiments discussed in detail below, the systems and methods presented herein are configured to automate certain management tasks for establishing and maintaining these merchant 132 to aggregate merchant 130 relationships.

Figure 2:
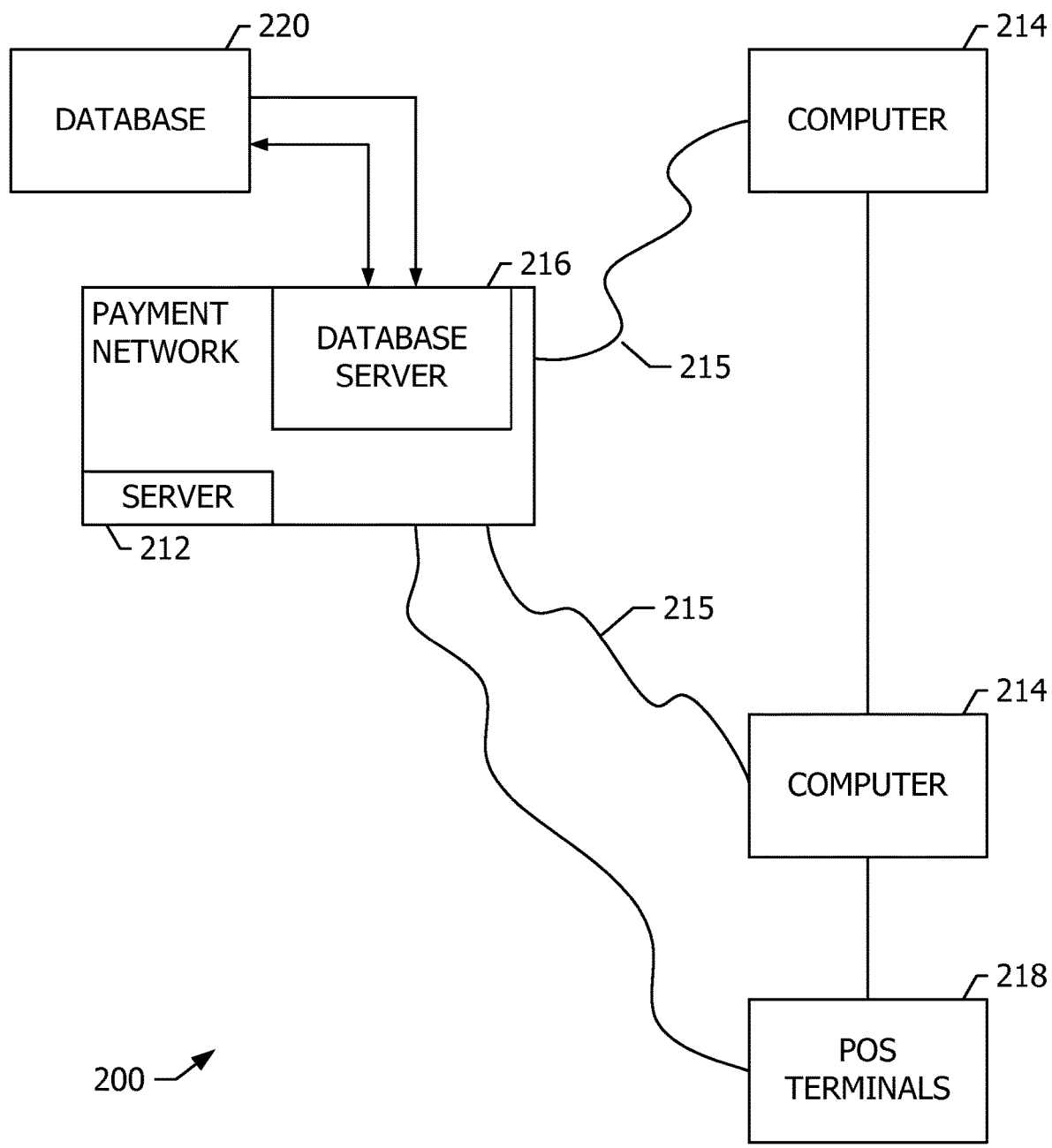

FIG. 2 is a simplified block diagram of an example aggregation system 200 including a plurality of computing devices connected in communication in accordance with the present disclosure. In the example embodiment, aggregation system 200 may be used for analyzing and maintaining merchant aggregation information, as well as aggregating data based on the merchant aggregation information. More specifically, in the example embodiment, aggregation system 200 includes an aggregation computing device 212, and a plurality of client sub-systems, also referred to as client systems 214, connected to aggregation computing device 212. In one embodiment, client systems 214 are computers associated with one or more of merchants 128 and 132 (shown in FIG. 1), merchant acquirers 134 (shown in FIG. 1), issuers 122 (shown in FIG. 1), and/or cardholders 124 (shown in FIG. 1). Client systems 214 may interconnected through many interfaces including a network 215, such as a local area network (LAN), a wide area network (WAN), the Internet, dial-in-connections, cable modems, special high-speed Integrated Services Digital Network (ISDN) lines, and RDT networks. Client systems 214 could be any device capable of interconnecting to the network 215 including a web-based phone, PDA, or other web-based connectable equipment.

Aggregation system 200 also includes point-of-sale (POS) terminals 218, which may be connected to client systems 214 and may be connected to aggregation computing device 212. POS terminals 218 are interconnected to network 215 through many interfaces including a network, such as a local area network (LAN) or a wide area network (WAN), dial-in-connections, cable modems, wireless modems, and special high-speed ISDN lines. POS terminals 218 could be any device capable of interconnecting to network 215 and including an input device capable of reading information from a consumer's financial transaction card.

A database server 216 is connected to database 220, which contains information on a variety of matters, as described below in greater detail. In one embodiment, centralized database 220 is stored on aggregation computing device 212 and can be accessed by potential users at one of client systems 214 by logging onto aggregation computing device 212 through one of client systems 214. In an alternative embodiment, database 220 is stored remotely from aggregation computing device 212 and may be non-centralized.

Database 220 may include a single database having separated sections or partitions or may include multiple databases, each being separate from each other. Database 220 may store transaction data generated as part of sales activities conducted over the processing network including data relating to merchants, account holders or customers, issuers, acquirers, and/or purchases made. Database 220 may also store account data including at least one of a cardholder name, a cardholder address, an account number, and other account identifier. Database 220 may also store merchant data including a merchant identifier that identifies each merchant registered to use the network, and instructions for settling transactions including merchant bank account information. Database 220 may also store purchase data associated with items being purchased by a cardholder from a merchant, and authorization request data. Database 220 may also store merchant association information for aggregate merchants 130 (shown in FIG. 1).

In the example embodiment, one of client systems 214 may be associated with acquirer bank 134 while another one of client systems 214 may be associated with issuer 122. POS terminal 218 may be associated with a participating merchant 128 and 132 or may be a computer system and/or mobile system used by a cardholder making an on-line purchase or payment. In the example embodiment, aggregation computing device 212 is associated with a network interchange, such as payment network 136 (shown in FIG. 1), and may be referred to as an interchange computer system. Aggregation computing device 212 may be used for processing transaction data. In addition, client systems 214 and/or POS terminal 218 may include a computer system associated with at least one of an online bank, a bill payment outsourcer, an acquirer bank, an acquirer processor, an issuer bank associated with a transaction card, an issuer processor, a remote payment system, and/or a biller.

Figure 3:
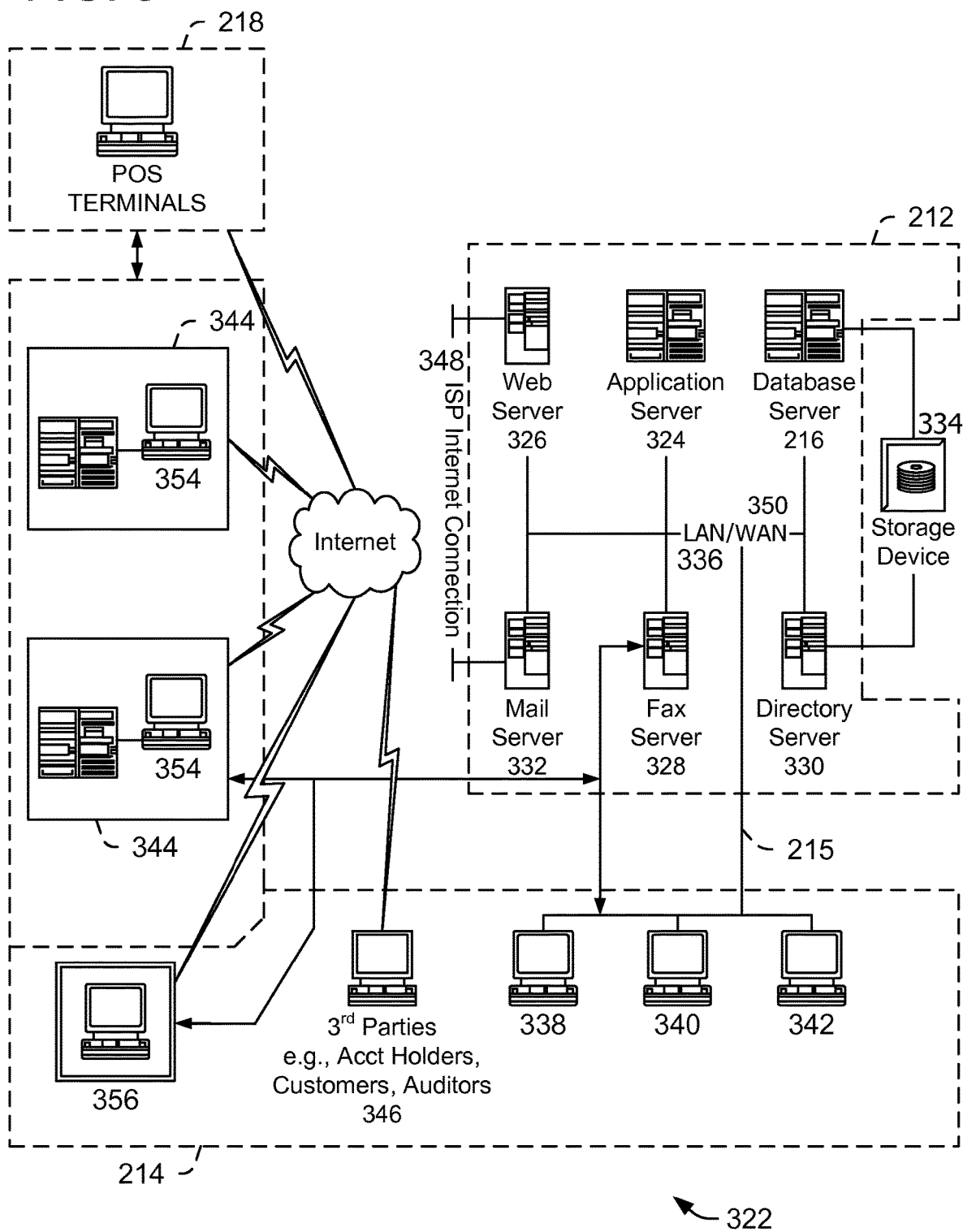

FIG. 3 is an expanded block diagram of an example aggregation computing system 322 having a server architecture and computer devices in accordance with one embodiment of the present disclosure. Components in system 322, identical to components of aggregation system 200 (shown in FIG. 2), are identified in FIG. 3 using the same reference numerals as used in FIG. 2. System 322 includes aggregation computing device 212, client systems 214, and POS terminals 218. Aggregation computing device 212 further includes database server 216, a transaction server 324, a web server 326, a fax server 328, a directory server 330, and a mail server 332. A storage device 334 is coupled to database server 216 and directory server 330. Servers 216, 324, 326, 328, 330, and 332 are coupled in a local area network (LAN) 336. In addition, an issuer bank workstation 338, an acquirer bank workstation 340, and a third party processor workstation 342 may be coupled to LAN 336. In the example embodiment, issuer bank workstation 338, acquirer bank workstation 340, and third party processor workstation 342 are coupled to LAN 336 using network connection 215. Workstations 338, 340, and 342 are coupled to LAN 336 using an Internet link or are connected through an Intranet.

Each workstation 338, 340, and 342 is a personal computer having a web browser. Although the functions performed at the workstations typically are illustrated as being performed at respective workstations 338, 340, and 342, such functions can be performed at one of many personal computers coupled to LAN 336. Workstations 338, 340, and 342 are illustrated as being associated with separate functions only to facilitate an understanding of the different types of functions that can be performed by individuals having access to LAN 336.

Aggregation computing device 212 is configured to be communicatively coupled to various individuals, including employees 344 and to third parties, e.g., account holders, customers, auditors, developers, consumers, merchants, acquirers, issuers, etc., 346 using an ISP Internet connection 348. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 350, local area network 215 could be used in place of WAN 350.

In the example embodiment, any authorized individual having a workstation 354 can access system 322. At least one of the client systems includes a manager workstation 356 located at a remote location. Workstations 354 and 356 are personal computers having a web browser. Also, workstations 354 and 356 are configured to communicate with aggregation computing device 212. Furthermore, fax server 328 communicates with remotely located client systems, including a client system 356 using a telephone link. Fax server 328 is configured to communicate with other client systems 338, 340, and 342 as well.

Figure 4:
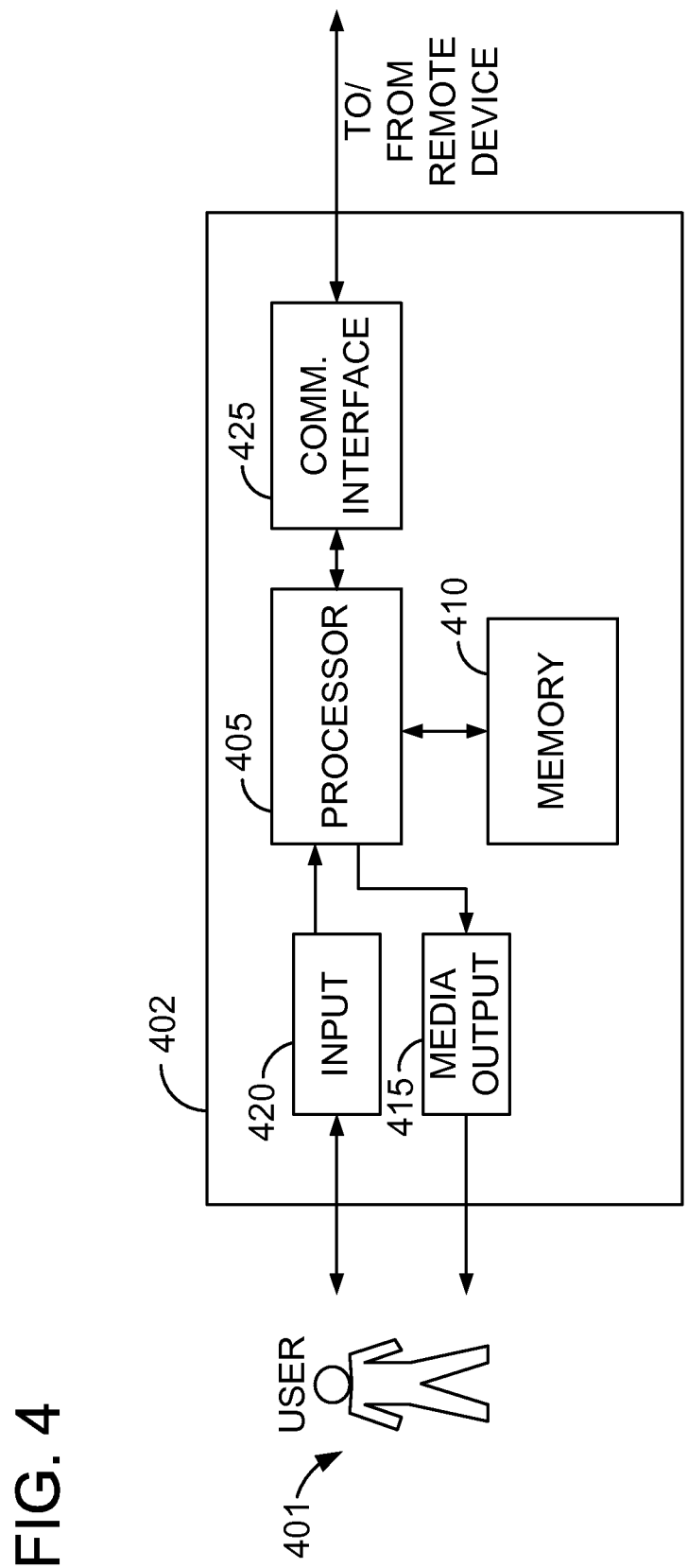

FIG. 4 illustrates an example configuration of a user system 402 operated by a user 401, such as the client devices shown in FIGS. 2 and 3. User system 402 may include, but is not limited to, client systems 314, 338, 340, and 342, POS terminal 218, workstation 354, and manager workstation 356. In the example embodiment, user system 402 includes a processor 405 for executing instructions. In some embodiments, executable instructions are stored in a memory area 410. Processor 405 may include one or more processing units, for example, a multi-core configuration. Memory area 410 is any device allowing information such as executable instructions and/or written works to be stored and retrieved. Memory area 410 may include one or more computer readable media.

User system 402 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device, a liquid crystal display (LCD), organic light emitting diode (OLED) display, or "electronic ink" display, or an audio output device, a speaker or headphones.

In some embodiments, user system 402 includes an input device 420 for receiving input from user 401. Input device 420 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 415 and input device 420. User system 402 may also include a communication interface 425, which is communicatively couplable to a remote device such as aggregation computing device 212. Communication interface 425 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

Stored in memory area 410 are, for example, computer readable instructions for providing a user interface to user 401 via media output component 415 and, optionally, receiving and processing input from input device 420. A user interface may include, among other possibilities, a web browser and client application. Web browsers enable users, such as user 401, to display and interact with media and other information typically embedded on a web page or a website from aggregation computing device 212. A client application allows user 401 to interact with a server application from aggregation computing device 212.

Figure 5:
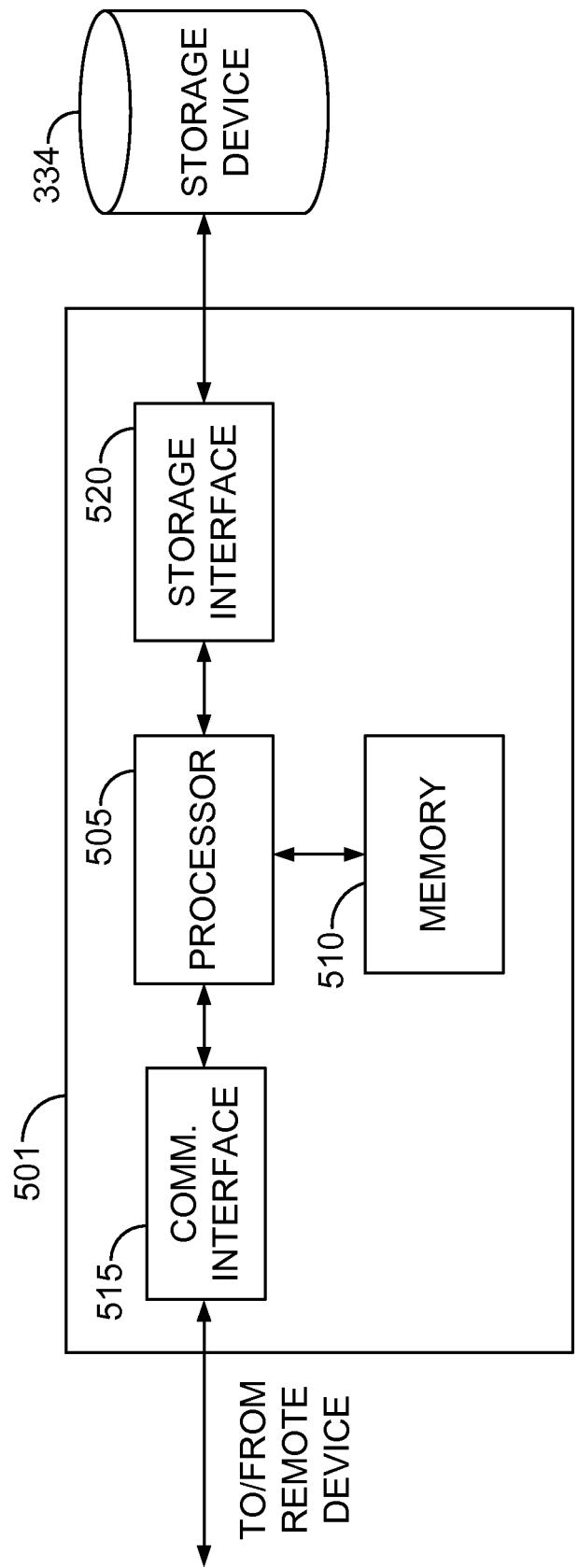

FIG. 5 illustrates an example configuration of a server system 501 such as aggregation computing device 212 (shown in FIGS. 2 and 3). Server system 501 may include, but is not limited to, database server 216, transaction server 324, web server 326, fax server 328, directory server 330, and mail server 332.

Server system 501 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server system 501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that server system 501 is capable of communicating with a remote device such as a user system or another server system 501. For example, communication interface 515 may receive requests from user system 214 via the Internet, as illustrated in FIGS. 2 and 3.

Processor 505 may also be operatively coupled to a storage device 334. Storage device 334 is any computer-operated hardware suitable for storing and/or retrieving data. In some embodiments, storage device 334 is integrated in server system 501. For example, server system 501 may include one or more hard disk drives as storage device 334. In other embodiments, storage device 334 is external to server system 501 and may be accessed by a plurality of server systems 501. For example, storage device 334 may include multiple storage units such as hard disks or solid state disks in a redundant array of inexpensive disks (RAID) configuration. Storage device 334 may include a storage area network (SAN) and/or a network attached storage (NAS) system.

In some embodiments, processor 505 is operatively coupled to storage device 334 via a storage interface 520. Storage interface 520 is any component capable of providing processor 505 with access to storage device 334. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 334.

Memory area 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
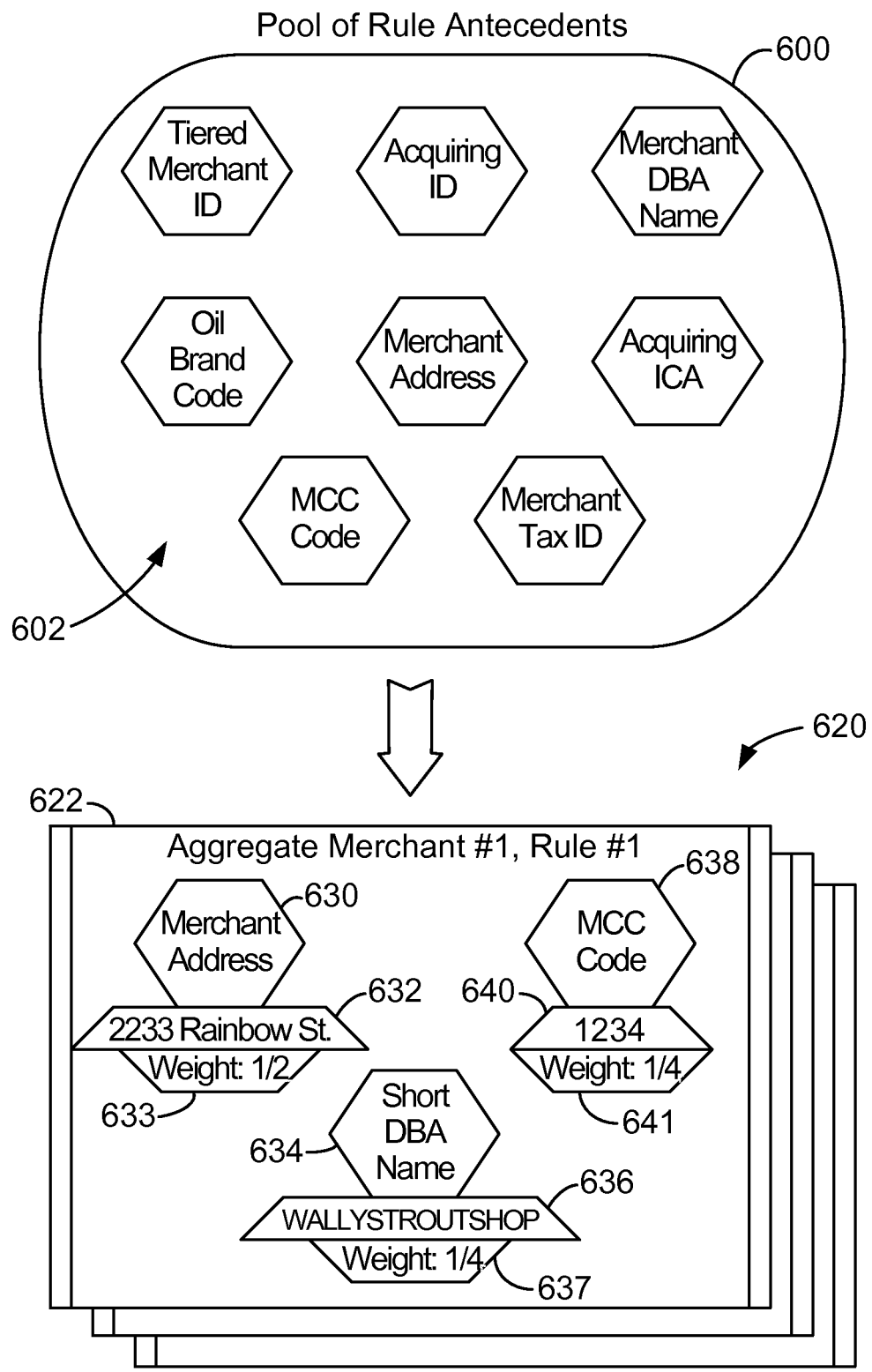

FIG. 6 illustrates example sets of data used by aggregation computing device 212 (shown in FIG. 2) to manage associations of merchants 132 to aggregate merchants 130 (shown in FIG. 1). Aggregation computing device 212 includes a pool of rule antecedents 600 that include a set of individual rule antecedents 602. Pool of rule antecedents 600, in the example embodiment, include antecedents 602 such as tiered merchant ID, acquiring ID, merchant DBA name, oil brand code, merchant address, acquiring Interbank Card Association ("ICA"), Merchant Category Code ("MCC"), and merchant tax ID. Alternatively any other rule antecedent 602 that enables the operation of the systems and methods described herein may be used. In some embodiments, rule antecedents 602 are associated with fields and/or field types in a database, such as database 220 (shown in FIG. 2). In operation, in the example embodiment, antecedents 602 are used to construct rules for automating the association of merchants 132 to aggregate merchants 130, described in greater detail below.

Further, in the example embodiment, aggregation computing device 212 includes merchant association rules 620. Each rule 620 is built out of one or more rule antecedents 602, and relate to elements of merchant identification, profile information, and/or transaction information involving the merchant. Further, each rule 620 includes a "target value" for an antecedent which, generally, represents a presumptively accurate value for an aspect of a particular aggregate merchant, such as an actual billing address, or the aggregate merchant's assigned MCC code. By way of example, consider merchant association "rule #1" 622 for "Aggregate Merchant #1". Rule 622 includes three rule antecedents 602, one for merchant address 630, a second for short DBA name 634, and a third for MCC code 638. Further, each rule antecedent 630, 634, and 638 within rule 622 also includes an associated value, such as values 632, 636, and 640. Rule 622, in the example, includes three associated values: for merchant address 630, the associated value 632 is "2233 Rainbow St."; for short DBA name 634, the associated value 636 is "WALLYSTROUTSHOP"; and for MCC code 638, the associated value 640 is "1234". Further, each rule antecedent 602 within rules 620 may, in some embodiments, have an associated weight, such as weights 633, 637, and 641. In operation, the rule antecedent/value/weight combinations (e.g., 630/632/633, 634/636/637, and 638/640/641) are used by aggregation computing device 212 when applying rule 622 during merchant association operations, described in greater detail below.

Figure 7:
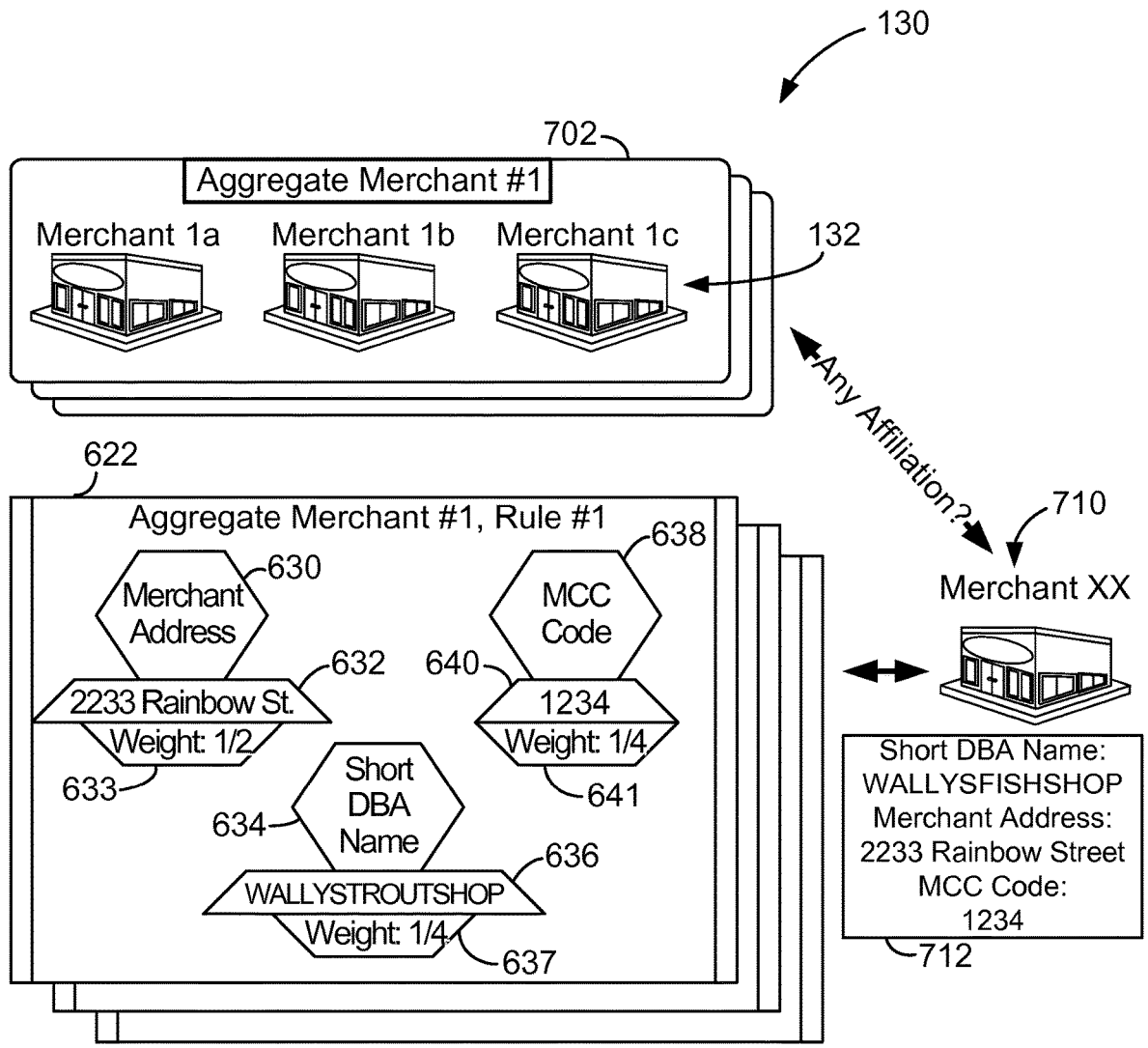

FIG. 7 illustrates example data sets used by aggregation computing device 212 (shown in FIG. 1) during merchant association analysis. Aggregation computing device 212 includes data structures representing aggregate merchants 130, such as "aggregate merchant #1" 702, and their associated merchants 132. Aggregation computing device 212 also includes a set of rules 620, such as the set of merchant rules 620 described above in reference to FIG. 6. Further, aggregation computing device 212 includes one or more merchants 710. In some embodiments, merchants 710 are "orphaned merchants" 710 (i.e., merchants that are not associated with an aggregate merchant, but that should be). Each merchant 710 includes merchant data 712 which, in some embodiments, is data derived either directly or indirectly from transactions such as payment card transactions 126 (shown in FIG. 1), or otherwise relates to the identification and/or classification of a merchant, such as merchant profile information. Merchant data 712, in some embodiments, includes data such as described in relation to pool of rule antecedents 600 (shown in FIG. 6).

During operation, in the example embodiment, aggregation computing device 212 examines a merchant 710, also referred to herein as an "orphaned merchant" 710, and attempts to find possible associations between merchant 710 and aggregate merchants 130. As used herein, the term "orphaned merchant" refers generally to a merchant that should be associated with one or more aggregate merchants 130, but is not. In some cases, merchant 710 may not actually be orphaned (e.g., when merchant 710 is not supposed to be associated with any aggregate merchant 130). In other cases, merchant 710 is orphaned, and thus needs to be associated with one or more aggregate merchants 130. In both cases, aggregation computing device 212 examines merchant 710 and attempts to find potential matches. It should be understood that while this example embodiment describes analyzing a single merchant with respect to many aggregate merchants (one merchant to many aggregate merchants), it is also possible to analyze a single aggregate merchant with respect to many merchants (many merchants to one aggregate merchant), as well as many merchants to many aggregate merchants.

In order to find potential associations between merchant 710 and aggregate merchants 130, aggregation computing device 212, during operation, applies rules 620 to merchant data 712. Merchant data 712, in some embodiments, may also be considered and referred to as "merchant location data" (i.e., data related to a merchant location). For example, presume aggregation computing device 212 is examining an example merchant 710 that includes merchant data 712 as shown in FIG. 7. In the example, merchant data 712 includes a short DBA name of "WALLYSFISHSHOP", a merchant address of "2233 Rainbow Street", and an MCC code of "1234". Such data may have been identified by aggregation computing device 212 from a payment card transaction consummated using a POS device 218 (shown in FIG. 2) and, as such, merchant data 712 may include data from one or more transactions sent by POS device 218. Presume also, for example, that merchant 710 is orphaned (i.e., not already associated with any aggregate merchants 130). It should be understood that while, in this example, the merchant 710 has no existing associations with aggregate merchants 130 within aggregation computing device 212, merchant 710 could have an existing association, and aggregation computing device 212, in some embodiments, may still examine potential associations with aggregate merchants 130 (i.e., having an already-existing association does not prohibit aggregation computing device 212 from performing association analysis and recommendations against an already-associated merchant, and there may be a motivation to search for wrongly-associated merchants).

Aggregation computing device 212 compares merchant data 712 to one or more merchant association rules 620. For example, considering again "Aggregate Merchant #1, Rule #1" 622, during comparison, merchant data 712 would be compared against rule 622. More specifically, each antecedent of rule 622 is compared to the corresponding data in merchant data 712 and examined for similarity. The comparison of each element of rule 620 to its corresponding element of merchant data 712, in the example embodiment, yields a value between 0.0 and 1.0 (0 representing least similarity, 1 representing most similarity). These individual similarity values are referred to herein as the "confidence sub-values" associated with the particular field of merchant data 712. For example, comparison of the rule's 622 merchant address 630 (e.g., "2233 Rainbow St.") to the merchant's 710 address in merchant data 712 (e.g., "2233 Rainbow Street") would yield a single confidence sub-value for that field. Moreover, the merchant address is an imperfect match, but very similar, and thus should yield a value indicating substantial similarity (i.e., a value near 1.0).

Similarity comparisons between rule fields and merchant data fields are, in the example embodiment, categorized into three different comparison types: (a) equality, (b) tiered comparison, and (c) hybrid (fields that fall somewhere in between). In the example embodiment, (a) antecedents "tiered merchant ID", "merchant tax ID", "oil brand code", and "acquiring ICA" utilize equality comparison, (b) "short DBA name", "merchant address", and "acquiring ID" utilized tiered comparison, and (c) "MCC" and "geography" utilize a hybrid approach.

The first comparison type, in the example embodiment, is equality comparison. During comparison, one field of a rule, such as rule 622, is compared with the corresponding field of the orphaned merchant, such as orphaned merchant 710. With equality comparison, either the comparison fields are equal or they are not, resulting in a confidence sub-value of 1 (equal) or 0 (not equal). For example, fields "acquiring ID", "tiered merchant ID", "merchant tax ID", "oil brand code", and "acquiring ICA" are fields that are evaluated with the equality comparison. Either the comparison fields are equal, or they are not. Thus, these fields generate either a confidence sub-value of either 1.0 or 0.0.

The second comparison type, in the example embodiment, is a tiered comparison. With tiered comparison, the fields being compared may be equal, and thus would generate a confidence sub-value of 1.0. However, under tiered comparison, unlike equality comparison, unequal fields may not necessarily generate a 0.0 confidence sub-value. A tiered comparison will have two or more tiers (other than complete equality), each having an associated score to assign as the confidence sub-value if the comparison meets the parameters of the particular tier. For example, in some embodiments, the "MCC" field is treated with tiered comparison. If the rule and merchant "MCC" fields (antecedents) match, they are assigned a score of 1.0. If they do not match, then other proximity information for the MCC is analyzed. For example, if the rule MCC value and the merchant MCC value are in the same industry, then a score of 0.6 is assigned. If they are not in the same industry, but if they are in the same sector, then a score of 0.3 is assigned. If they are not in the same industry or sector, then a score of 0.0 is assigned. In this example embodiment, similarity information other than the character information present within the fields is utilized (e.g., tables correlating industry and sector categorization for MCC codes). In other embodiments, geography is similarly applied, with proximity of geographic regions used as the measure of similarity. It should be understood that other tiering is possible for both MCC and geography, and that tiering is also possible for other antecedents/fields, including the other antecedents 602 used in the example embodiments of this disclosure.

The third comparison type, in the example embodiment, is a fuzzy comparison. In some embodiments, fuzzy comparison based on n-gram comparison of strings is used to evaluate data for character similarity. In this embodiment, the analysis involves an approximate matching methodology described in U.S. Pat. No. 8,219,550, issued 10 Jul. 2012 to Merz, et al., which is hereby incorporated by reference in its entirety. Using the n-gram approach to fuzzy comparison of strings, aggregation computing device 212 compares the rule information for a particular antecedent to the merchant information for the corresponding antecedent. For example, the merchant address of rule 622 (i.e., the string "2233 Rainbow St.") would be compared to the merchant address of orphaned merchant 710 (i.e., the string "2233 Rainbow Street"). Most of the n-grams of each string are identical, because the strings are nearly identical. The n-gram comparison generates a value between 0.0 and 1.0, with 0.0 representing no similarity, and 1.0 representing approximately identical similarity. The n-gram comparison value is then assigned as the confidence sub-value for the particular field compared.

This fuzzy comparison methodology utilizes a technique of string comparison that captures, mathematically, the linguistic concept of "nearness", as applied to biller names and addresses. For example, consider an example comparison of an individual's names and addresses (for illustrative purposes):

TABLE 1

Example Transaction Record Data Fields

| REC-NUM | NAME | STREET ADDRESS | CITY | STATE | ZIP |
|---|---|---|---|---|---|
| 1 | Wally Lo Faro | 909 N 10th St | Boise | ID | 83702 |
| 2 | Walter LoFaro | 909 North 10th Street | Stanley | ID | 83706 |

These transactions may refer to the same biller, "Walter Lo Faro" of Idaho, but the only exact match is the state. In some embodiments, the data may be standardized by common methods known in the art in order to facilitate better string comparison. In the example embodiment, address standardization is an algorithm implemented in SAS that uses a database table to standardize tokens parsed from the address. City name standardization uses postal codes to assign preferred city names corresponding to one or more zip codes in proximity to each other. Further, both names and addresses are converted to all capital letters. For example, after some common standardization techniques are applied, the two transactions may be stored as:

TABLE 2

Example Standardized Transaction Record Data Fields

| REC-NUM | NAME | STREET ADDRESS | CITY | STATE | ZIP |
|---|---|---|---|---|---|
| 1 | WALLY LO FARO | 909 N 10TH ST | BOISE | ID | 83702 |
| 2 | WALTER LOFARO | 909 N 10TH ST | BOISE | ID | 83706 |

After standardization, string comparison begins. In the example embodiment, "n-grams" are used to compare name and address information between the payee information (i.e., the transaction information) and biller information. An n-gram, generally, is a substring of length n. More specifically, n-grams are used to break up a string into constituent components that may be used for further analysis. In some embodiments, n-grams of length "2" are used (i.e., "2-grams"). For example, the name "WALLY" generates the following 2-grams: "_W", "WA", "AL", "LL", "LY", and "Y_". It should be understood, however, that other length n-grams may be used may be used with this system.

Further, in the example embodiment, 2-grams may be converted to a mathematical integer. For example, let's suppose out character set contains 37 elements: the alphabet, the digits, and the space. Then there would be 37*37=1369 possible 2-grams. Order the 2-grams AA, AB, . . . , AZ, A0, . . . , A9, A_, BA, . . . , B_, . . . , _A, . . . , _. For any string define the string's 2-gram vector representation to be the vector:

$$v=(v_1, v_2, \ldots, v_{1369})$$

where $v_i$=the number of times the $i^{th}$ 2-gram appears in the string. For WALLY we have:

TABLE 3

Example 2-gram Order for "WALLY"

| 2-gram | 2-gram's order |
|---|---|
| WA | 851 |
| AL | 12 |
| LL | 456 |
| LY | 469 |

The 2-gram vector representation of WALLY is then the vector v above with all of the components $v_i$=0 except for i in {12, 456, 469, 851} where $v_i$=1. Representing v in the data as an array consisting primarily of 0s is wasteful. In practice, there are rows in a data set for each nonzero 2-gram (the $v_i$ from above).

TABLE 4

Example Term Count for 2-grams in "WALLY"

| String | 2-gram | term_count |
|---|---|---|
| WALLY | AL | 1 |
| WALLY | LL | 1 |
| WALLY | LY | 1 |
| WALLY | WA | 1 |
| ABAB | AB | 2 |
| ABAB | BA | 1 |

No information is lost during this process. Conversion back to the vector representation v is possible. In operation, we want to know if, for a given name and address pair, whether a 2-gram came from the name or the address. Below are the rows for the data in our original example.

TABLE 5

Example 2-grams for Two Example Payees

| recnum | 2-gram | term type | term count |
|---|---|---|---|
| 1 | _W | 1 | 1 |
| 1 | WA | 1 | 1 |
| 1 | AL | 1 | 1 |
| 1 | LL | 1 | 1 |
| 1 | LY | 1 | 1 |
| 1 | Y_ | 1 | 1 |
| 1 | _L | 1 | 1 |
| 1 | LO | 1 | 1 |
| 1 | O_ | 1 | 2 |
| 1 | _F | 1 | 1 |
| 1 | FA | 1 | 1 |
| 1 | AR | 1 | 1 |
| 1 | RO | 1 | 1 |
| 1 | _9 | 2 | 1 |
| 1 | 90 | 2 | 1 |
| 1 | 09 | 2 | 1 |
| 1 | 9_ | 2 | 1 |
| 1 | _N | 2 | 1 |

TABLE 5-continued

Example 2-grams for Two Example Payees

| recnum | 2-gram | term type | term count |
|---|---|---|---|
| 1 | N_ | 2 | 1 |
| 1 | _1 | 2 | 1 |
| 1 | 10 | 2 | 1 |
| 1 | 0T | 2 | 1 |
| 1 | TH | 2 | 1 |
| 1 | H_ | 2 | 1 |
| 1 | _S | 2 | 1 |
| 1 | ST | 2 | 1 |
| 1 | T_ | 2 | 1 |
| 2 | _W | 1 | 1 |
| 2 | WA | 1 | 1 |
| 2 | AL | 1 | 1 |
| 2 | LT | 1 | 1 |
| 2 | TE | 1 | 1 |
| 2 | ER | 1 | 1 |
| 2 | R_ | 1 | 1 |
| 2 | _L | 1 | 1 |
| 2 | LO | 1 | 1 |
| 2 | OF | 1 | 1 |
| 2 | FA | 1 | 1 |
| 2 | AR | 1 | 1 |
| 2 | RO | 1 | 1 |
| 2 | O_ | 1 | 1 |
| 2 | _9 | 2 | 1 |
| 2 | 90 | 2 | 1 |
| 2 | 09 | 2 | 1 |
| 2 | 9_ | 2 | 1 |
| 2 | _N | 2 | 1 |
| 2 | N_ | 2 | 1 |
| 2 | _1 | 2 | 1 |
| 2 | 10 | 2 | 1 |
| 2 | 0T | 2 | 1 |
| 2 | TH | 2 | 1 |
| 2 | H_ | 2 | 1 |
| 2 | _S | 2 | 1 |
| 2 | ST | 2 | 1 |
| 2 | T_ | 2 | 1 |

In one embodiment, a measure of string similarity using 2-grams would simply be to count the number of 2-grams shared by two strings. For WALLY and WALTER, this would equal 2. For example, the strings ABAC, ABACC, ABACCC, . . . all share two 2-grams with ABA but each string in the sequence is less similar to ABA than the preceding one. The measure of string similarity may be refined to take into account strings of varying length. Further, the measure may be rescaled (divide it by something) so that identical strings have similarity equal to 1. For example:

similarity (string 1, string 2) = 1

$\Rightarrow 1 = \frac{\text{Number of 2 - grams in common}}{(\text{junk involving string 1})(\text{junk involving string 2})}$ If string1 and string2 are the same then they have the same number of 2-grams, say n of them.

$\Rightarrow \frac{n}{(\text{junk involving string})^2} = 1$ $\Rightarrow (\text{junk involving string 1})^2 = n$ $\Rightarrow (\text{junk involving string 1}) = \sqrt{n}$ In one embodiment, a measure of string similarity is defined as:

$$\text{similarity (string 1, string 2)} = \frac{\text{number of shared 2 - grams}}{\sqrt{\text{number of 2 - grams in string 1}} \sqrt{\text{number of 2 - grams in string 2}}}$$

Identical strings now have similarity equal to 1. Further, for example, the similarity of "WALTER" and "WALLY" is approximately 0.447.

The above is one embodiment of a string similarity function. In another embodiment, the possibility of repeated 2-grams may be addressed, as well as strings sharing uncommon 2-grams, like CZ should be more similar than those only sharing common ones like TH or LE. Suppose we have two strings to compare and they have 2-gram vector representations:

$v = (v_1, v_2, \ldots, v_{1369})$ $u = (u_1, u_2, \ldots, u_{1369})$

Our previous versions of string similarity have not used the vector components. If you look you will not see any $u_i$ anywhere in the formulas. Remember that $u_i$ is the total number of occurrences of the $i^{th}$ 2-gram in the string so incorporating it into our formula will address the first issue. Here is another embodiment of a measure of similarity:

$$\text{similarity (string 1, string 2)} = \frac{\sum_{i=1}^{1369} u_i v_i}{\sqrt{\sum_{i=1}^{1369} u_i^2} \sqrt{\sum_{i=1}^{1369} v_i^2}}$$

The new numerator deals with repeated 2-grams while the new denominator rescales it so identical strings still have a similarity of 1. Further, this may be described as the cosine of the angle between the vectors u and v. The numerator is the dot product (inner product) of the vectors and the denominator is the product of their lengths. This puts our similarity in the realm of linear algebra and we can now bring to bear all of the tools of the field on the matching problem. For example, the un-weighted 2-gram similarity between 'ABABC' and 'ABD' is 0.57735027, and between 'ABABC' and 'ABABD' is 0.83333333.

For the second issue, an idea from the field of text mining may be used. As it stands now, each 2-gram makes an equal contribution into the similarity score. Another way to say this is that the 2-grams are equally weighted. The basic idea behind term frequency-inverse document frequency (TF/IDF) weighting is that the highest weighted 2-grams are those that occur most often in a small set of strings.

The term frequency for a 2-gram in a string is something we've already seen and we have several equivalent ways to describe it: (a) it is the number of times a 2-gram occurs in a string; (b) it is the field term_count in the example data above; and (c) it is the component $v_i$ from the vector representation of the string, where the 2-gram in question is the $i^{th}$ one. Inverse document frequency is the adjustment we give those weights to account for a 2-gram's relative uniqueness in the master data set and it is defined as:

IDF of the 2 - gram XY =

$\log_{10} \frac{\text{total number of strings in the master data}}{1 + \text{number of strings containing } XY}$ Here XY stands for any 2-gram. The rarer XY is in the master set of strings, the smaller the denominator and since the numerator is constant we get what we wanted: rarer 2-grams yielding larger weights. The "1+" is there to avoid potential division by 0 issues; it does not affect the value of the weight significantly. The logarithm is there to reduce the range of possible weights and to smooth them out. We can now define the TF/IDF-weighted 2-gram vector representation of a string as:

$$v=(v_1, v_2, \ldots, v_{1369})$$

where:

$$v_i=(\text{term frequency of } i^{th} \text{ 2-gram in the string})*(\text{IDF of } i^{th} \text{ 2-gram in the master})$$

In plain English, all we've done multiply the term by term the weights by the appropriate IDFs. Finishing our example based on the name "WALLY LO FARO":

TABLE 6

Example 2-gram Weights

| rec num | 2-gram | term type | term count | 2-gram weight |
|---|---|---|---|---|
| 1 | _W | 1 | 1 | 1.34157 |
| 1 | WA | 1 | 1 | 1.42929 |
| 1 | AL | 1 | 1 | 0.82517 |
| 1 | LL | 1 | 1 | 0.93024 |
| 1 | LY | 1 | 1 | 1.50429 |
| 1 | Y_ | 1 | 1 | 0.86584 |
| 1 | _L | 1 | 1 | 1.06145 |
| 1 | LO | 1 | 2 | 1.19318 |
| 1 | O_ | 1 | 1 | 1.17492 |
| 1 | _F | 1 | 1 | 1.14269 |
| 1 | FA | 1 | 1 | 1.54156 |
| 1 | AR | 1 | 1 | 0.75258 |
| 1 | RO | 1 | 1 | 1.03955 |
| 1 | _9 | 2 | 1 | 1.95164 |
| 1 | 90 | 2 | 1 | 1.49506 |
| 1 | 09 | 2 | 1 | 1.67481 |
| 1 | 9_ | 2 | 1 | 1.11125 |
| 1 | _N | 2 | 1 | 0.86686 |
| 1 | N_ | 2 | 1 | 0.63231 |
| 1 | _1 | 2 | 1 | 1.02324 |
| 1 | 10 | 2 | 1 | 0.90418 |
| 1 | 0T | 2 | 1 | 0 |
| 1 | TH | 2 | 1 | 1.03733 |
| 1 | H_ | 2 | 1 | 1.04732 |
| 1 | _S | 2 | 1 | 0.36729 |
| 1 | ST | 2 | 1 | 0.47176 |
| 1 | T_ | 2 | 1 | 0.89096 |
| 2 | _W | 1 | 1 | 1.34157 |
| 2 | WA | 1 | 1 | 1.42929 |
| 2 | AL | 1 | 1 | 0.82517 |
| 2 | LT | 1 | 1 | 1.44582 |
| 2 | TE | 1 | 1 | 0.91807 |
| 2 | ER | 1 | 1 | 0.64556 |
| 2 | R_ | 1 | 1 | 0.91512 |
| 2 | _L | 1 | 1 | 1.06145 |
| 2 | LO | 1 | 1 | 1.19318 |
| 2 | OF | 1 | 1 | 1.43168 |
| 2 | FA | 1 | 1 | 1.54156 |
| 2 | AR | 1 | 1 | 0.75258 |
| 2 | RO | 1 | 1 | 1.03955 |
| 2 | O_ | 1 | 1 | 1.17492 |
| 2 | _9 | 2 | 1 | 1.95164 |
| 2 | 90 | 2 | 1 | 1.49506 |
| 2 | 09 | 2 | 1 | 1.67481 |
| 2 | 9_ | 2 | 1 | 1.11125 |
| 2 | _N | 2 | 1 | 0.86686 |
| 2 | N_ | 2 | 1 | 0.63231 |
| 2 | _1 | 2 | 1 | 1.02324 |
| 2 | 10 | 2 | 1 | 0.90418 |
| 2 | 0T | 2 | 1 | 0 |
| 2 | TH | 2 | 1 | 1.03733 |
| 2 | H_ | 2 | 1 | 1.04732 |

TABLE 6-continued

Example 2-gram Weights

| rec num | 2-gram | term type | term count | 2-gram weight |
|---|---|---|---|---|
| 2 | _S | 2 | 1 | 0.36729 |
| 2 | ST | 2 | 1 | 0.47176 |
| 2 | T_ | 2 | 1 | 0.89096 |

Thus, the comparison of names generates a value, or confidence sub-value, of 0.762256. (The addresses are identical, so their similarity is equal to 1).

While the example embodiment describes using an n-gram approach to string comparison, other string comparison methods that enable operation of the systems and methods described herein may be used. Further, in some embodiments, only a portion of an antecedent and/or field may be used during comparison. For example, a rule value, such as value 632, may only contain a substring of the associated antecedent, such as a partial street address, or a partial short DBA name.

Once aggregation computing device 212 has generated confidence sub-values for a particular rule's antecedents as compared to a particular orphaned merchant, such as between rule 622 and orphaned merchant 710, the sub-values are combined. For rules having only a single antecedent, there is no combination of sub-values because there is only one sub-value (i.e., the single confidence sub-value generated from the single antecedent). For rules configured with more than one antecedent, in the example embodiment, the multiple sub-values are combined by weighting the sub-values. Each rule antecedent may have a weight assigned to it, such as weight 633, "½", weight 637, "¼", and weight 641, "¼". Alternatively, each rule antecedent within rules 620 may be equally weighted. System applies the weights, such as weights 633, 637, and 641, to the respective confidence sub-values, thus adjusting the confidence sub-values prior to combining them. It should be understood that weights are shown in FIGS. 6 and 7 in fractional notation for illustrative purposes, thus "½" is equivalent to 0.5 decimal, and "¼" is equivalent to 0.25 decimal. Further, it should be understood that weighting may be accomplished by other methods, such as not using a separate weight, but instead using different scales of values for each individual antecedent relative to the other antecedents, such as, for example, valuing one antecedent between 0.0 and 5.0 and another field between 0.0 and 2.0.

In the example embodiment, rule 622 defines a weight 633, "½" (or decimal 0.5), to the merchant street address 630 antecedent. As such, whatever sub-value is generated by the comparison operation will be multiplied by the antecedent's associated weight. In the example shown, the sub-value for merchant street address 630 would be multiplied by 0.5. Similarly, the sub-values for short DBA name 634 and MCC code 638 would each be multiplied by 0.25 ("¼", as defined by their respective weights 637 and 641). Thus, the weighting of merchant street address 630 sub-value is twice the relative weight of short DBA name 634 and MCC code 638 sub-values. Once each sub-value is weighted, the resulting weighted sub-values are added together to provide a weighted confidence value. Aggregation computing device 212 uses the weighted confidence value as the measure of similarity between rule 622 and orphaned merchant 710.

In some embodiments, rule types (not shown) are associated with rules 620. Each rule type identifies a particular set of antecedents that may help identify certain merchants 132 to their associated aggregate merchant 130. As such, a user of aggregation computing device 212 may configure a set of rule types that may be used for various aggregate merchants 130 as templates. Rule values for each antecedent present, such as values 632, 636, and 640, may still need to be identified. In some embodiments, weights such as weight 633, 637, and 641 may be standard with the rule type, and/or the weights may be customizable by the user. In the example embodiment, the following rule types of "standard", "tiered", "tax", "acquirer", "manual", and "oil" are implemented with the marked antecedents:

TABLE 7

Rule Types

| | | Standard | Tiered | Tax | Acquirer | Manual | Oil |
|---|---|---|---|---|---|---|---|
| Antecedent | oil brand code | | | | | | x |
| | short dba name | x | x | x | | X | x |
| | address | | | | | X | |
| | acquiring id | | | | x | | |
| | geography | x | | x | | | |
| | tiered id | | x | | | | |
| | tax id | | | x | | | |
| | mcc | x | x | x | x | | x |
| | ica | | | | x | | |

Rule 622, as shown in FIG. 7, is a "standard" type rule. Rule 622, in the illustrated example, includes antecedents merchant address 630, short DBA name 634, and MCC code 638 from the "standard" rule type. The user has entered values 632, 636, and 640 for each antecedent. Further, while the "standard" rule type was configured with equal weighting (i.e., one third for each of the three antecedents present), the user has modified the weighting to more heavily weigh similarity of merchant address over the other two antecedents present (i.e., merchant address 630 weighted with "0.5", and both short DBA name 634 and MCC code 638 weighted with "0.25").

In some embodiments, rules 620 and/or rule types may also define the type of comparison operation (i.e., the comparison type) that aggregation computing device 212 will use for each particular antecedent. For example, rule 622 is configured to use the third comparison type, fuzzy comparison, for both merchant address 630 and short DBA name 634, but to use the second comparison type, hybrid comparison, for comparing MCC code 638. Each comparison generates a sub-value between 0.0 and 1.0, which is then weighted and combined, as described above. It should be understood that, while the example comparisons described herein generate sub-values between 0.0 and 1.0, other value ranges are possible without deviating from the scope of the present disclosure. In the example embodiments described herein, the sub-values range restrictions assist with relative weighting.

In some embodiments, aggregation computing device 212 may limit the set of merchants 710 analyzed, or the set of rules 620 used to generate comparison values. For example, a user of aggregation computing device 212 may want to analyze only a certain aggregate merchant, such as aggregate merchant 702. That aggregate merchant may have one or more rules associated with itself, thereby identify the rule set to use. Further, the user may want to analyze all merchants 710 available to aggregation computing device 212, or the user may wish to limit to just orphaned merchants, thereby defining the merchant set to use. The merchant set may even include merchants 132 already assigned to aggregate merchant 702. After identifying the rule set and merchant set, aggregation computing device 212 would then apply each of the rules to each of the merchants as described above, thereby generating comparison scores for each merchant as to each rule of the aggregate merchant. These scores may be used by, for example, a human auditor who analyzes the scores and makes a final determination as to which merchants are associated with which aggregate merchants, or the system itself may associate particular merchants based on highest scorers or scores above a certain pre-determined thresholds.

Figure 8:
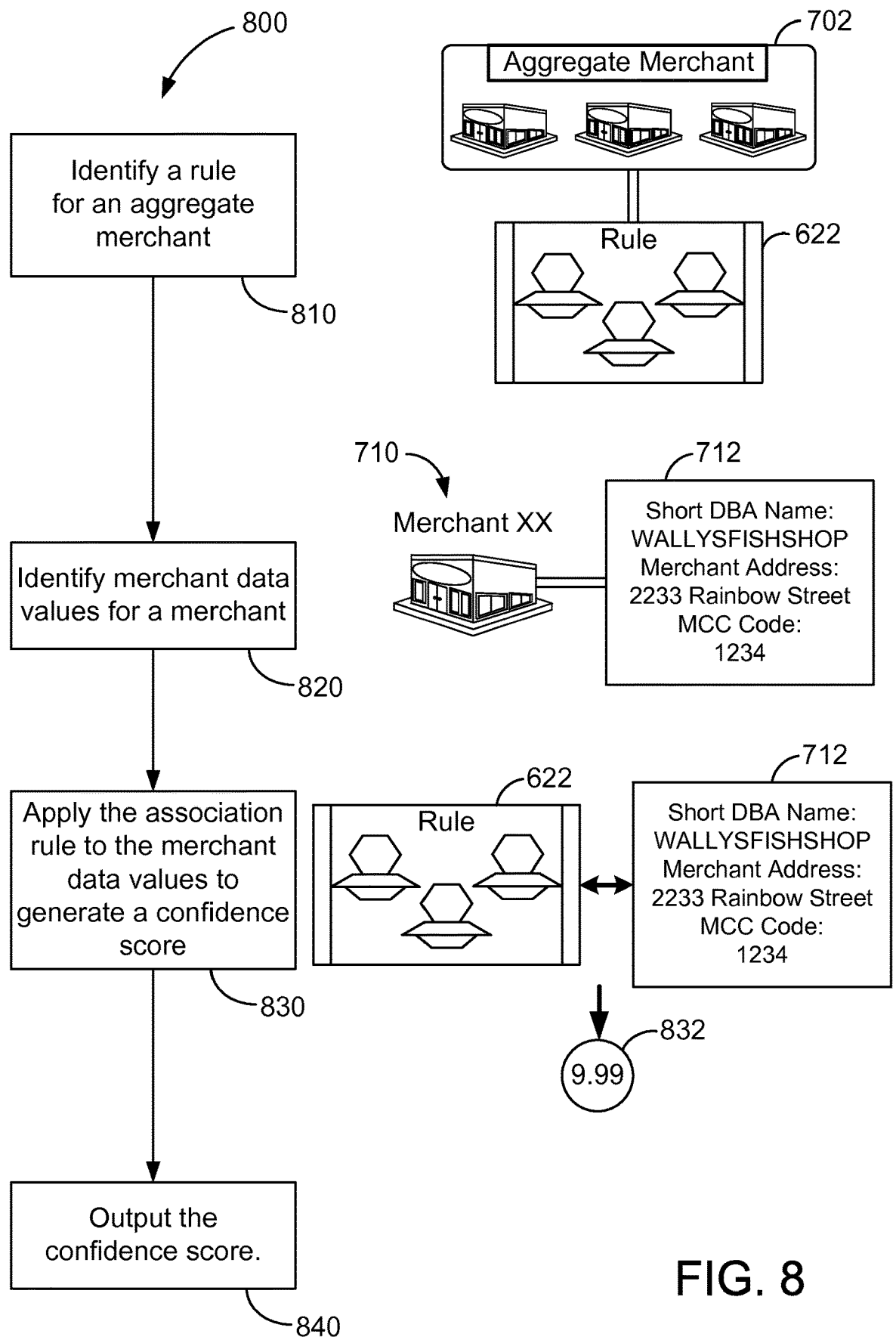

FIG. 8 is an example method 800 for associating related merchants implemented using the aggregation computing system shown in FIGS. 2 and 3. Method 800, in the example embodiment, includes identifying 810 an association rule for an aggregate merchant, such as rule 622 for aggregate merchant 702. Rule 622 includes one or more antecedents 602 (shown in FIG. 6), such as antecedents 630, 634, and 638 (shown in FIG. 7), each antecedent including a model value for the antecedent associated with the aggregate merchant, such as values 632, 636, and 640 (shown in FIG. 7). In some embodiments, rule 622 includes weights for each antecedent present, such as weights 633, 637, and 641 (shown in FIG. 7). In other embodiments, rule 622 includes a comparison type (not shown) for one or more antecedents present in rule 622. In still other embodiments, comparison types are assigned to an antecedent within pool of antecedents 600 (shown in FIG. 7) such that the comparison type for the antecedent is inherited from pool of antecedents 600 and not defined within individual rules such as rule 622. And in still other embodiments, comparison types may be assigned within pool of antecedents 600 as a default comparison type, but may also be defined within individual rules such as rule 622 such that the rule's comparison type for an antecedent will trump the default comparison type as defined for the antecedent within pool of antecedents 600.

Further, in the example embodiment, method 800 includes identifying 820 one or more merchant data values associated with a merchant, such as data values 712 associated with merchant 710. Merchant data values 712 have individual fields (antecedents) that correspond to an antecedent within rule 622. For example, "WALLYSFISHSHOP" is an example merchant data value within merchant data values 712 which corresponds with antecedent "short DBA name" 634 (shown in FIG. 7) having a model value of "WALLYSTROUTSHOP" 636 (shown in FIG. 7).

Also, in the example embodiment, method 800 includes applying 830 the association rule, such as rule 622, to the one or more merchant data values, such as merchant data values 712. In some embodiments, applying 830 includes comparing the model value for each antecedent with a merchant data value associated with the corresponding antecedent. As such, a confidence score 832 is generated for the merchant, the confidence score representing a likelihood of association between the merchant, such as merchant 710, and the aggregate merchant, such as aggregate merchant 702. Confidence score 832 is then output 840 to, for example, a user of aggregation computing device 212. In other embodiments, method 800 also includes aggregation computing device 212 selecting a highest confidence score from a plurality of confidence scores and assigning that merchant with the appropriate aggregate merchant.

Figure 9:
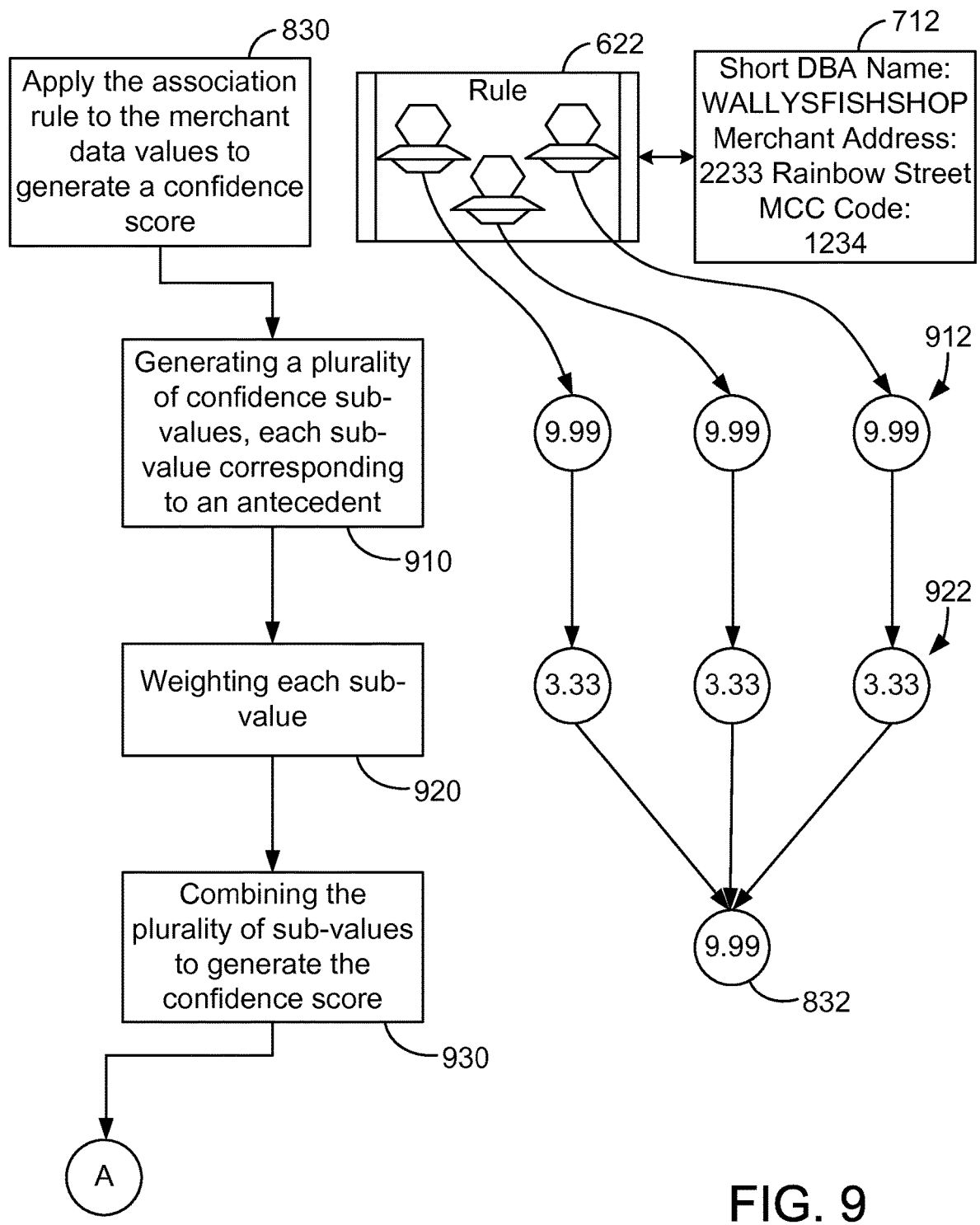

FIG. 9 illustrates additional steps for associating related merchants that, in some embodiments, are used for applying 830 the association rule to the merchant data value as shown in FIG. 8. In some embodiments, method 800 (shown in FIG. 8) includes generating 910 a plurality of confidence sub-values 912. Each confidence sub-value 912 corresponds to an antecedent of the one or more antecedents within rule 622. For example, comparison of merchant address 630 (shown in FIG. 7) from rule 622 (i.e., using value 632) with the merchant address "2233 Rainbow Street" from merchant data values 712 generates a single confidence sub-value 912. Likewise, comparison of short DBA name and MCC code between rule 622 and merchant data values 712 generate two additional confidence sub-values 912.

Also, in some embodiments, applying 830 includes weighing 920 each sub-value 912 with an associated weight prior to combining 930. In some embodiments, the associated weight may be defined by the antecedent definition within the rule, such as weight 633 for merchant address 630 within rule 622. In other embodiments, the associated weight may be defined by aggregation computing device 212 using a default policy, or may be defined by pool of antecedents 600. In the example embodiment, an individual sub-value 912 is multiplied by an associated weight, such as weight 633, to generate a plurality of weighted sub-values 922.

Further, in some embodiments, applying 830 includes combining 930 the plurality of confidence sub-values 912 or weighted sub-values 922 to generate confidence score 832. In the example embodiment, combining 930 includes adding weighted sub-values 922 together to generate confidence score 832.

Figure 10:
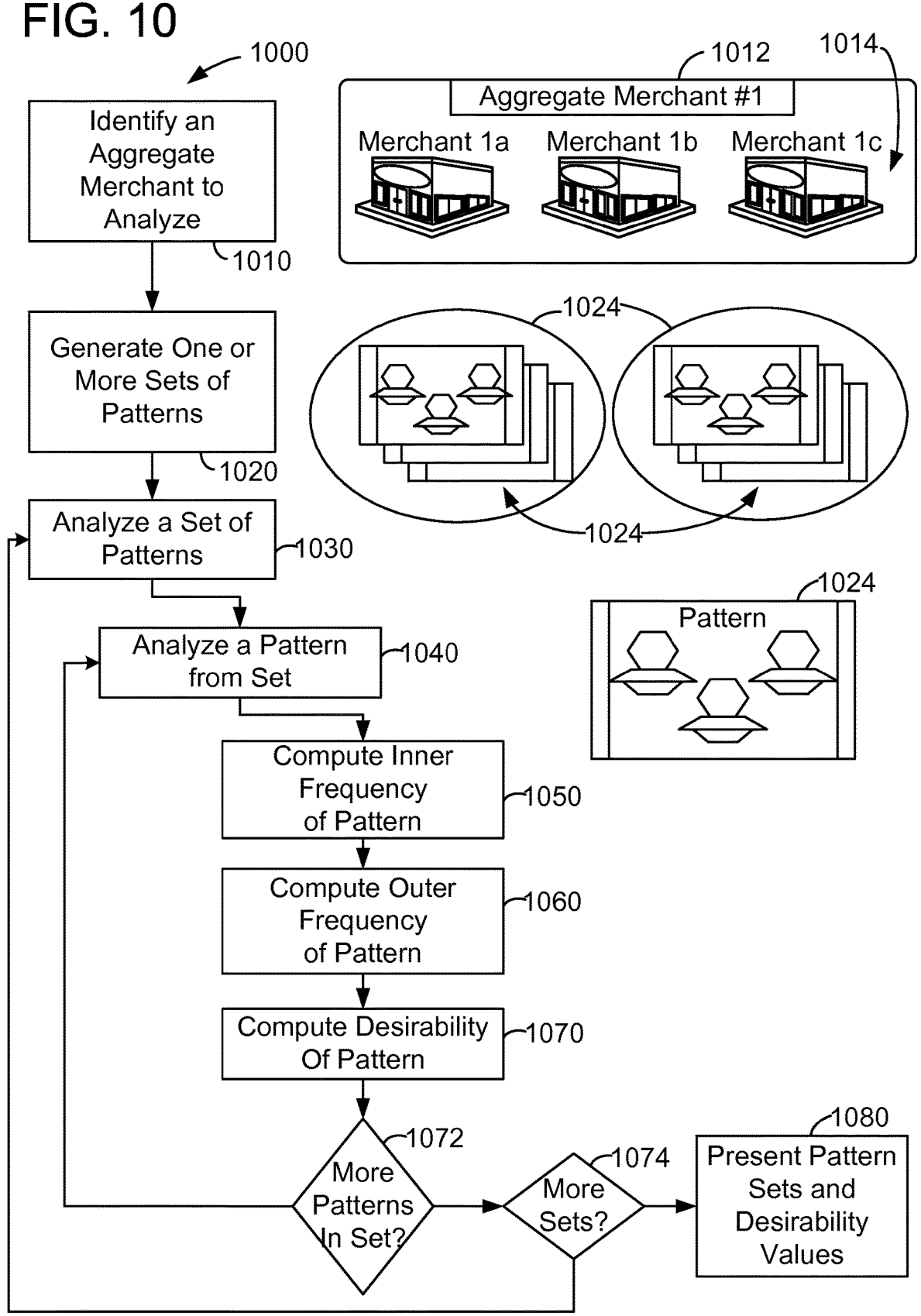

FIG. 10 is an example method 1000 for building rules and sets of rules that may be used to associate related merchants in accordance with the present disclosure. In some embodiments, aggregation computing device 212 (shown in FIG. 2) performs the steps of method 1000. In the example embodiment, an aggregate merchant is identified 1010 for analysis, such as "aggregate merchant #1" 1012. Aggregate merchant 1012 includes a set of merchants 1014 already associated with itself. In some embodiments, merchants 1014 are "known-good" (or presumed-good) merchants of aggregate merchant 1012 (i.e., an analyst using method 1000 has examined merchants 1014 and believes they are all properly associated with this particular aggregate merchant 1012).

Also in the example embodiment, one or more sets of patterns 1022 are generated 1020. The term "pattern", as used herein, refers to a potential rule (i.e., a pattern is a proposed rule that has not yet been selected to actually use as a rule). Patterns are discussed herein in terms of whether or not they would assign particular merchants to a particular aggregate merchant, but they are not used to actually assign merchants to aggregate merchants (like rules may be). A pattern, such as pattern 1024, has a similar structure to the rules described above, such as rules 620 (shown in FIG. 7). In other words, a pattern consists of one or more antecedents, each antecedent having an associated value. In some embodiments, like rules, a pattern also includes a comparison type. In other embodiments, patterns 1024 are identical to rules 620. Pattern sets 1022, therefore, represent potential sets of rules that may be used to identify merchants that belong to an aggregate merchant, such as merchants 1014 to aggregate merchant 1012. Ideally, as discussed above, an accurate rule set will be a set of rules that properly associates only the merchants that actually belong to an aggregate merchant, and exclude those that do not. Method 1000 helps analyze the performance of possible rule sets (i.e., pattern sets) to see which rule sets perform best.

In some embodiments, pattern sets 1022 are generated 1020 manually, such as by human analysts. In the example embodiment, pattern sets 1022 are generated 1020 automatically by aggregation computing device 212 using the steps set forth below, and may then be selected for use by human analysts or by aggregation computing device 212.

For any given aggregate merchant, such as aggregate merchant 1012, there are many different qualifying pattern sets possible, and often no obvious best. For example, since merchant DBA name, MCC code, and country code are normally available for a location (i.e., merchant), a set consisting of standard (and possibly manual) rules is one possibility. When present, the tiered merchant ID may be used. If an aggregate merchant is affiliated with gas stations, oil brand code is a possible antecedent to include, and so on. In the example embodiment, in order to make the determination as to what types of patterns 1024 to include in a pattern set 1022, the merchants known to be associated with the aggregate merchant are analyzed. The distributions of variables, such as tiered merchant ID, merchant tax ID, etc., are examined, and those that exceed a utility threshold are used. For example, this analysis might result in an example instruction such as "build 3 pattern sets—(1) standard patterns (with possible manual patterns), (2) tiered merchant ID and standard patterns (with possible manual patterns), and (3) tiered merchant ID, tax ID, and standard patterns (with possible manual patterns)."

Thus, for each pattern set 1022, several patterns 1024 are built. Each pattern 1024, like the rules described above, will consist of one or more antecedents, along with associated values for each antecedent. The pattern types are defined by the example instruction above, but the values for each antecedent need to be defined. In the example embodiment, the patterns generated by aggregation computing device 212 all have some elements of commonality: (1) they all consider the merchant DBA name as an antecedent, and they can do this in two ways—by considering a substring of the antecedent, or by requiring equality for the rule to be satisfied; (2) they all consider another field in the antecedent that may be "wildcarded" (i.e., ignored); (3) they all consider a third field in the antecedent that may not be wildcarded. For example, consider the following:

TABLE 8

Example Pattern Set

| ANTECEDENT | | | | | | |
|---|---|---|---|---|---|---|
| MERCHANT_ COMPARE_ NAME | COMPARE_ BEGIN_ POSITION | COMAPRE_ LENGTH | SUBSTRING_ RULE | COUNTRY_ CODE | MCC_ CODE | AGGREGATE_ MERCHANT_ ID |
| WALLYSTROUT | 1 | 11 | YES | USA | 5555 | 12345 |
| WALLYSTROUT | 1 | 11 | YES | * | 5555 | 12345 |
| WALLYSTROUTSHOP | | | NO | USA | 5555 | 12345 |
| WALLYSTROUTSHOP | | | NO | * | 5555 | 12345 |

The first example pattern would assign every location (i.e., merchant) in the United States of America (country_code=USA) with MCC=5555 that has "WALLYSTROUT" as the first 11 characters of its merchant DBA name to an aggregate merchant "12345" (i.e., aggregate_merchant_id=12345). The second example pattern would ignore country_code, and thus would assign all merchants with MCC=555 having "WALLYSTROUT" as the first 11 characters of its merchant DBA name to the same example aggregate merchant. The third example pattern would assign every location in the USA with MCC=5555 whose merchant DBA name is equal to "WALLYSTROUTSHOP" to the same aggregate merchant. And the fourth example pattern is similar to the third pattern, just ignoring country code.

Referring again to FIG. 10, once one or more sets of patterns 1022 have been generated 1020, a set of patterns is analyzed 1030. In the example embodiment, an initial run flag is provided. If 1040 the initial run flag is set to "yes", then outer and inner frequencies are computed 1050 for every pattern 1024, as described in more detail below. If 1040 the initial run flag is set to "no", then method 1000 updates 1052 frequencies.

In the example embodiment, method 1000 further includes computing 1060 the desirability of all patterns 1024, discussed in greater detail below. Method 1000 also includes adding 1070 the most desirable rules to the rule set and deleting it from the pattern set. Further, if 1080 there are locations not qualified by a rule yet, then the process of updating 1052 frequencies is repeated until there are none remaining. Adding 1070 a rule causes the inner and outer frequencies of the other patterns to possibly change (e.g., the same location could be qualified by more than one pattern). Method 1000 then outputs 1090 the rule set for use.

As such, conditional 1040 enables method 1000 to avoid some re-computing 1050 operations. For example, if a first pattern qualifies 12 total locations, 10 of which it should have qualified, 2 of which it should not have, then that first pattern has an inner frequency of 10 and an outer frequency of 12. As such, any other pattern that qualifies any of those 12 locations will need to have its inner and outer frequencies adjusted (i.e., updated 1052). In one embodiment, instead of re-computing the entire inner and outer frequencies, detailed logic and set theory may be used to adjust the inner and outer frequencies already computed 1052.

With regard to computing 1050 inner and outer frequencies for a pattern, in the example embodiment, each pattern is analyzed individually. The inputs to analysis include: (1) a pattern type (i.e., rule type); (2) a set of location data (i.e., merchant data, such as merchant data 712 (shown in FIG. 7), for all merchants 1014 associated with aggregate merchant 1012); (3) a non-wildcarded variable (such as MCC code in the examples above); (4) a wildcarded variable (such as country code in the examples above); and (5) initial run flag (i.e., a flag indicating if the pattern type is the first in the pattern set or not—used for housekeeping purposes). Further, in the example embodiment, all of the n-grams are determined for the merchant DBA name. In the example embodiments described herein, all of the patterns output by aggregation computing device 212 use merchant DBA name as an antecedent, and only examines substrings starting in position 1 (i.e., compare-begin_position=1). It should be understood, however, that these are merely examples, and that other embodiments and pattern generation is anticipated by this disclosure. Other types of merchant data may be suitable to n-gram comparison.

For each pattern, an inner frequency is computed. As used herein, the term "inner frequency" is defined as the number of already-associated merchants that the pattern "qualifies" (i.e., looking only at the merchants already associated with the aggregate merchant, how many of these would this pattern match to the aggregate merchant). As used herein, when a pattern is referred to as "qualifying" a particular merchant for an aggregate merchant, this means that the pattern would associate that merchant with the aggregate merchant being analyzed (i.e., if this pattern was made a rule and used, it would associate the merchant with the aggregate merchant). Also as used herein, the term "over-qualification" refers to when a pattern qualifies a particular merchant for an aggregate merchant, but that merchant should not be associated with the aggregate merchant (i.e., the pattern would wrongly qualify that merchant).

Also for each pattern, in the example embodiment, an outer frequency is computed. As used herein, the term "outer frequency" is defined as the total number of merchants (already-associated or not) that the pattern would qualify. To distinguishing inner frequency from outer frequency, inner frequency analyzes only a pool of merchants already associated with an aggregate merchant, where outer frequency analyzes a larger pool of merchants, regardless of whether or not they are currently associated with the aggregate merchant. In some embodiments, unnecessary patterns are eliminated. For example, consider the following two patterns:

TABLE 9

Additional Example Patterns

| MERCHANT_COMPARE_NAME | COMPARE_BEGIN_POSITION | COMAPRE_LENGTH | SUBSTRING_RULE | COUNTRY_CODE | MCC_CODE | INNER_FREQ |
|---|---|---|---|---|---|---|
| WALLYSTROUT | 1 | 11 | YES | USA | 5555 | 10 |
| WALLYSTROUTS | 1 | 11 | YES | USA | 5555 | 10 |

The first pattern may be discarded. Both patterns qualify 10 locations in the aggregate merchant, and the outer frequency of the first pattern is guaranteed to be greater than or equal to the second pattern. In other words, the first pattern is at best as good as the second pattern, and may be worse due to more potential over-qualifications.

With regard to computing 1060 a desirability value of patterns, in the example embodiment, the desirability value gives a numeric approximation for evaluating the strength of patterns. In some embodiments, better patterns qualify more merchants and leave few out. One example formula that is used for desirability value is:

$$\text{desirability} = \frac{\text{inner frequency}}{1 + \text{outer frequency} - \text{inner frequency}}$$

Where the extra 1 in the denominator is present simply to avoid division by 0 issues for patterns that do not over-qualify any locations.

In some embodiments, the selection of patterns is an iterative process, where the most desirable pattern is selected, the inner and outer frequencies are recomputed, and the process is repeated. When there are no more locations remaining, the loop ends.

In other embodiments, manual rules may be created for inclusion in a rule set for an aggregate merchant. Manual rules are used to create a direct assignment of one particular merchant to one particular aggregate merchant. Manual rules may be used to manage a small number of merchants for which there seems to be no good rule to properly qualify them. Manual rules come in two varieties, inclusive and exclusive, and include two antecedents, location ID and aggregate merchant ID. Some rules may over-qualify a small number of locations. Thus, it may be beneficial to write an "exclusion" rule that specifically excludes those locations. Generally speaking, exclusive manual rules are desirable when you need fewer of them than the inner frequency of the rule. This need may be expressed mathematically as "inner frequency<outer frequency<2(inner frequency)". Similarly, a rule set may qualify all of the merchants that should be associated with an aggregate merchant except a few. Thus, it may be beneficial to write an "inclusion" rule that specifically includes those locations that should be included, but that were not qualified by the rule set. This need may be expressed mathematically as "outer frequency≥2(inner frequency)". Since these rules are inclusive, the undesirable rule may be deleted from the rule set that they are replacing.

Referring to FIG. 8 and method 800, in some embodiments, the steps shown in FIG. 10 may be used to identify 1010 rules for aggregate merchants, such as rule 622 and aggregate merchant 702.

Figure 11:
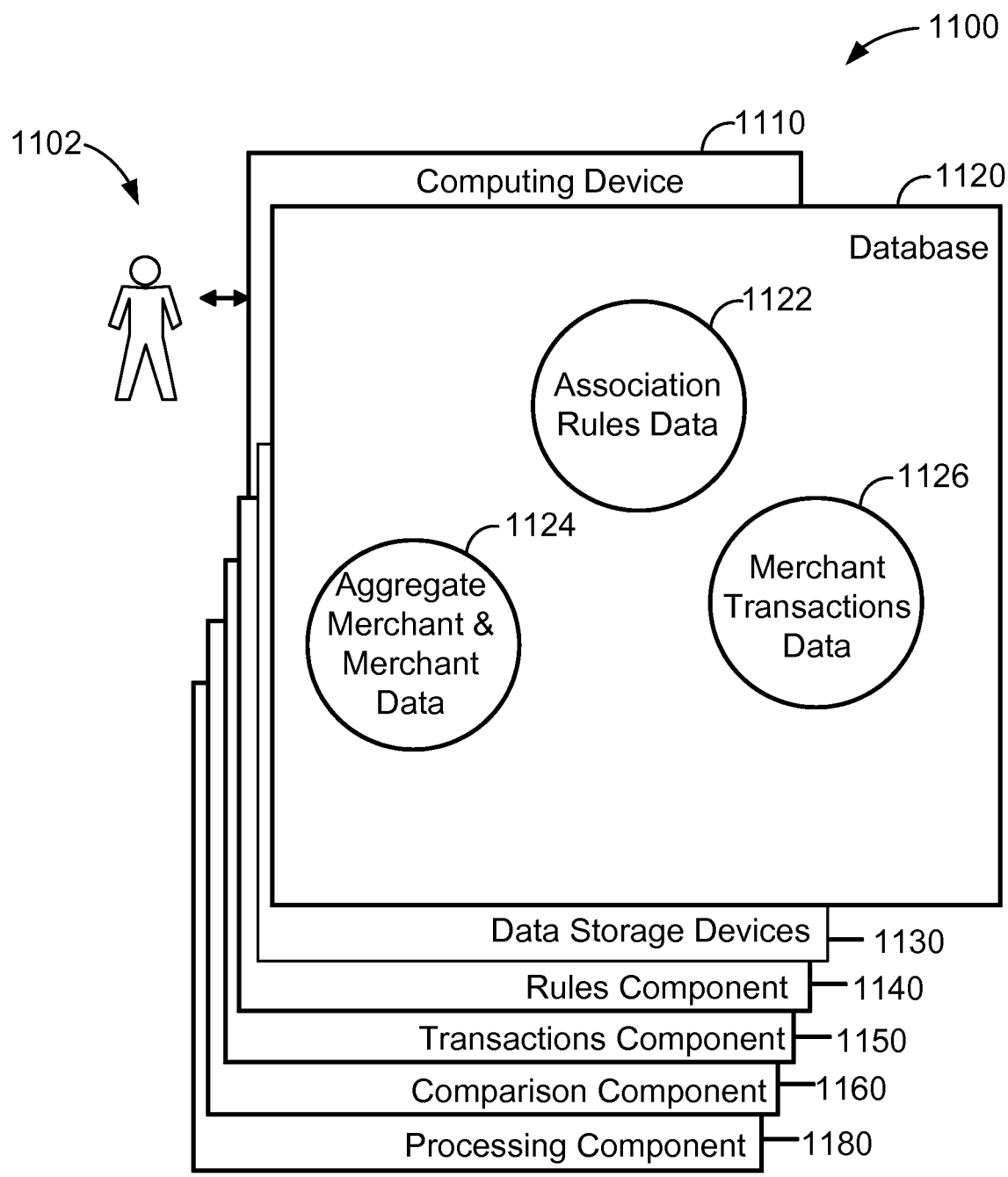

FIG. 11 shows an example configuration 1100 of a database 1120 within a computing device 1110, along with other related computing components, that may be used to associate related merchants. In some embodiments, computing device 1110 is similar to aggregation computing device 212 (shown in FIG. 2). Database 1120 may be coupled to several separate components within computing device 1110, which perform specific tasks.

In the example embodiment, database 1120 includes association rules data 1122, aggregate merchant and merchant data 1124, and merchant transactions data 1126. In some embodiments, database 1120 is similar to database 220 (shown in FIG. 2). Association rules data 1122 includes information associated with association rules, such as rules 620 (shown in FIG. 6). Aggregate merchant and merchant data 1124 includes data related to aggregate merchants, such as aggregate merchants 130 (shown in FIG. 7), and merchants, such as merchants 132 and 710 (shown in FIG. 7). Transactions data 1126 includes transactions and other information associated with, for example, payment card transactions originating from merchants 132 and 710, and other types of transactions.

Computing device 1110 includes the database 1120, as well as data storage devices 1130. Computing device 1110 also includes a rules component 1140 for identifying, administering, generating, or otherwise interacting with association rules, such as rules 622, within the association rules data 1122 in database 1120. Computing device 1110 also includes a transactions component 1150 for identifying merchant information from transactions, and the merchant transactions data 1126. A comparison component 1160 is also included for comparing rules with merchant data and generating comparison values and sub-values. A processing component 1180 assists with execution of computer-executable instructions associated with the merchant association system.

The above-described embodiments of methods and systems of associating related merchants for an aggregate merchant. The system identifies rules associated with an aggregate merchant and applies those rules to merchant and/or merchant data to generate relative scores that indicate a likelihood of whether or not each particular merchant is associated with the given aggregate merchant. As a result, the methods and systems described herein facilitate associating individual merchants with an aggregate merchant so that individual merchants' affiliations with aggregate merchants may be known and used during other computing operations.

As will be appreciated based on the foregoing specification, the above-described embodiments of the disclosure may be implemented using computer programming or engineering techniques including computer software, firmware, hardware or any combination or subset thereof, wherein the technical effect is identifying, in memory, an association rule for an aggregate merchant, the association rule including one or more antecedents, each antecedent including a model value for the antecedent associated with the aggregate merchant, identifying, in memory, one or more merchant data values associated with a merchant, the one or more merchant data values each corresponding to an antecedent of the one or more antecedents, applying, by a computing device, the association rule to the one or more merchant data values by comparing the model value for each antecedent with a merchant data value associated with the corresponding antecedent, thereby generating a confidence score for the merchant, the confidence score representing a likelihood of association between the merchant and the aggregate merchant, and outputting the confidence score. Any such resulting program, having computer-readable code means, may be embodied or provided within one or more computer-readable media, thereby making a computer program product (i.e., an article of manufacture) according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. In other words, the machine-readable medium and the computer-readable medium described herein are non-transitory. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for automatic generation of an association rule for associating a merchant with an aggregate merchant, said method using an aggregate computing device having a processor and a memory, said aggregate computing device in communication with a payment processor, wherein the payment processor is configured to process payment card transactions over a payment processor network, said method comprising:

receiving, by the aggregate computing device from the payment processor, a plurality of merchant data associated with a plurality of merchants, wherein the plurality of merchants includes one or more aggregate merchants, wherein an aggregate merchant represents an association of related merchants of the plurality of merchants, wherein the plurality of merchant data is transmitted from a plurality of point-of-sale (POS) devices to the payment processor, wherein each POS device of the plurality of POS devices is associated with a merchant of the plurality of merchants, and wherein the payment processor is part of the payment processor network;

storing, in the memory by the aggregate computing device, the plurality of merchant data;

analyzing, by the aggregate computing device, a selected aggregate merchant from the one or more aggregate merchants, wherein a plurality of known merchants are associated with the selected aggregate merchant;

generating, by the aggregate computing device, a plurality of antecedents for the selected aggregate merchant, each antecedent of the plurality of antecedents corresponding to a data field in the plurality of merchant data;

building, by the aggregate computing device, a plurality of pattern sets, each of the plurality of pattern sets including one or more antecedents of the plurality of antecedents;

automatically generating, by the aggregate computing device, a plurality of patterns for each pattern set, each of the plurality of patterns including respective model values for the one or more antecedents in the pattern set and representing a potential rule that associates merchants with the selected aggregate merchant;

calculating, by the aggregate computing device for each pattern, an inner frequency and an outer frequency, wherein the inner frequency counts known merchants that qualify under the pattern, and the outer frequency counts each merchant of the plurality of merchants that qualify under the pattern;

evaluating, by the aggregate computing device, the inner frequency and outer frequency for each pattern against a metric;

selecting, by the aggregate computing device based on the evaluating, one of the patterns as an association rule for the selected aggregate merchant;

adjusting, by the aggregate computing device, the inner frequency and the outer frequency of at least one other pattern in response to a qualification of certain merchants under the selected pattern;

receiving, by the aggregate computing device from the payment processor, one or more payment card transactions originating from one or more POS devices of the plurality of POS devices, wherein the one or more POS devices are associated with a first merchant of the plurality of merchants;

identifying, by the aggregate computing device from the one or more payment card transactions, one or more merchant data values associated with the first merchant, wherein the first merchant is not designated to any aggregate merchant of the one or more aggregate merchants based on the one or more merchant data values;

determining, by the aggregate computing device, whether each of the one or more merchant data values corresponds to at least one antecedent of a subset of antecedents included in the association rule;

applying, by the aggregate computing device, the association rule to the one or more merchant data values by comparing the model value for each antecedent with a merchant data value associated with the corresponding antecedent;

generating, by the aggregate computing device, a confidence score for the first merchant, the confidence score representing a likelihood that the first merchant is associated with the selected aggregate merchant;

assigning, in the memory by the aggregate computing device, an affiliation between the first merchant and the selected aggregate merchant based on the confidence score, wherein the affiliation indicates that subsequent payment card transactions originated at the first merchant are attributable to the selected aggregate merchant;

receiving, by the aggregate computing device from the payment processor, a subsequent payment card transaction originating from a POS device of the plurality of POS devices, wherein the POS device is associated with the first merchant, and wherein the subsequent payment card transaction includes a merchant identifier associated with the first merchant; and concurrently with processing of the subsequent payment card transaction by the payment processor:
  accessing, by the aggregate computing device, the memory to perform a lookup for the affiliation of the first merchant using the merchant identifier;
  determining, by the aggregate computing device, that the first merchant is associated with the selected aggregate merchant based on the affiliation; and
  aggregating, by the aggregate computing device, the subsequent payment card transaction to a plurality of payment card transactions associated with the selected aggregate merchant.

2. The method of claim 1 further comprising applying the association rule to the plurality of merchants, thereby generating a plurality of confidence scores.

3. The method of claim 1, wherein applying the association rule further comprises:
generating a plurality of confidence sub-values, each confidence sub-value corresponding to one of the subset of antecedents; and combining the plurality of confidence sub-values to generate the confidence score.

4. The method of claim 3 further comprising identifying the association rule including the subset of antecedents, each antecedent further including an associated weight, wherein the association rule, the subset of antecedents, and the associated weight are stored in a database with a plurality of association rules, and wherein the processor accesses the database in view of the selected aggregate merchant to identify the association rule.

5. The method of claim 4, wherein applying the association rule further comprises weighing each sub-value of the plurality of sub-values with the associated weight prior to combining.

6. The method of claim 4, wherein identifying the association rule further comprises identifying the association rule including the subset of antecedents, each antecedent having a comparison type, and
wherein applying the association rule further comprises comparing the model value for each antecedent with the merchant data value based at least in part on the comparison type.

7. The method of claim 1, wherein applying the association rule further comprises generating n-gram representations for the model value of an antecedent and a corresponding merchant data value.

8. An aggregate computing device for automatic generation of an association rule for associating a merchant with an aggregate merchant, said aggregate computing device: comprising a processor communicatively coupled to a memory, said aggregate computing device in communication with a payment processor, wherein the payment processor is configured to process payment card transactions over a payment processor network, said aggregate computing device programmed to:
receive, from the payment processor, a plurality of merchant data associated with a plurality of merchants, wherein the plurality of merchants includes one or more aggregate merchants, wherein an aggregate merchant represents an association of related merchants of the plurality of merchants, wherein the plurality of merchant data is transmitted from a plurality of point-of-sale (POS) devices to the payment processor, wherein each POS device of the plurality of POS devices is associated with a merchant of the plurality of merchants, and wherein the payment processor is part of the payment processor network;
store, in memory, the plurality of merchant data;
analyze a selected aggregate merchant from the one or more aggregate merchants, wherein a plurality of known merchants are associated with the selected aggregate merchant;
generate a plurality of antecedents for the selected aggregate merchant, each antecedent of the plurality of antecedents corresponding to a data field in the plurality of merchant data;
build a plurality of pattern sets, each of the plurality of pattern sets including one or more antecedents of the plurality of antecedents;
automatically generate a plurality of patterns for each pattern set, each of the plurality of patterns including respective model values for the one or more antecedents in the pattern set and representing a potential rule that associates merchants with the selected aggregate merchant;
calculate, for each pattern, an inner frequency and an outer frequency, wherein the inner frequency counts known merchants that qualify under the pattern, and the outer frequency counts each merchant of the plurality of merchants that qualify under the pattern;
evaluate the inner frequency and outer frequency for each pattern against a metric;
select, based on the evaluating, one or more patterns as an association rule for the selected aggregate merchant;
adjust the inner frequency and the outer frequency of at least one other pattern in response to a qualification of certain merchants under the selected pattern;
receive, from the payment processor, one or more payment card transactions originating from one or more POS devices of the plurality of POS devices, wherein the one or more POS devices are associated with a first merchant of the plurality of merchants;
identify, based on the one or more payment card transactions stored within the memory, one or more merchant data values associated with the first merchant, wherein the first merchant is not designated to any aggregate merchant of the one or more aggregate merchants based on the one or more merchant data values;
determine whether each of the one or more merchant data values corresponds to at least one antecedent of a subset of antecedents included in the association rule;
apply the association rule to the one or more merchant data values by comparing the model value for each antecedent with a merchant data value associated with the corresponding antecedent;
generate a confidence score for the first merchant, the confidence score representing a likelihood that the first merchant is associated with the selected aggregate merchant;
assign, in the memory, an affiliation between the first merchant and the selected aggregate merchant based on the confidence score, wherein the affiliation indicates that subsequent payment card transactions originated at the first merchant are attributable to the selected aggregate merchant;
receive, from the payment processor, a subsequent payment card transaction originating from a POS device of the plurality of POS devices, wherein the POS device is associated with the first merchant, and wherein the subsequent payment card transaction includes a merchant identifier associated with the first merchant; and
concurrently with processing of the subsequent payment card transaction by the payment processor:
access the memory to perform a lookup for the affiliation of the first merchant using the merchant identifier;
determine that the first merchant is associated with the selected aggregate merchant based on the affiliation; and
aggregate the subsequent payment card transaction to a plurality of payment card transactions associated with the selected aggregate merchant.

9. The aggregate computing device of claim 8, wherein the aggregate computing device is further programmed to apply the association rule to the plurality of merchants, thereby generating a plurality of confidence scores.

10. The aggregate computing device of claim 8, wherein applying the association rule further comprises:
generating a plurality of confidence sub-values, each confidence sub-value corresponding to one of the subset of antecedents; and
combining the plurality of confidence sub-values to generate the confidence score.

11. The aggregate computing device of claim 10, wherein the aggregate computing device is further configured to identify the association rule including the subset of antecedents, each antecedent further including an associated weight.

12. The aggregate computing device of claim 11, wherein applying the association rule further comprises weighing each sub-value of the plurality of sub-values with the associated weight prior to combining.

13. The aggregate computing device of claim 11, wherein identifying the association rule further comprises identifying the association rule including the subset of antecedents, each antecedent having a comparison type, and
wherein applying the association rule further comprises comparing the model value for each antecedent with the merchant data value based at least in part on the comparison type.

14. The aggregate computing device of claim 8, wherein applying the association rule further comprises generating n-gram representations for the model value of an antecedent and a corresponding merchant data value.

15. At least one non-transitory computer-readable storage media having computer-executable instructions embodied thereon, wherein when executed by at least one processor in communication with a memory, the computer-executable instructions cause the processor to:
receive, from a payment processor, a plurality of merchant data associated with a plurality of merchants, wherein the plurality of merchants includes one or more aggregate merchants, wherein an aggregate merchant represents an association of related merchants of the plurality of merchants, wherein the plurality of merchant data is transmitted from a plurality of point-of-sale (POS) devices to the payment processor, and wherein each POS device of the plurality of POS devices is associated with a merchant of the plurality of merchants;
store, in the memory, the plurality of merchant data;
analyze a selected aggregate merchant from the one or more aggregate merchants, wherein a plurality of known merchants are associated with the selected aggregate merchant;
generate a plurality of antecedents for the selected aggregate merchant, each antecedent of the plurality of antecedents corresponding to a data field in the plurality of merchant data;
build a plurality of pattern sets, each of the plurality of pattern sets including one or more antecedents of the plurality of antecedents;
automatically generate a plurality of patterns for each pattern set, each of the plurality of patterns including respective model values for the one or more antecedents in the pattern set and representing a potential rule that associates merchants with the selected aggregate merchant;
calculate, for each pattern, an inner frequency and an outer frequency, wherein the inner frequency counts known merchants that qualify under the pattern, and the outer frequency counts each merchant of the plurality of merchants that qualify under the pattern;
evaluate the inner frequency and outer frequency for each pattern against a metric;
select, based on the evaluating, one or more patterns as an association rule for the selected aggregate merchant;
adjust the inner frequency and the outer frequency of at least one other pattern in response to a qualification of certain merchants under the selected pattern;
receive, from a payment processor in communication with the processor, one or more payment card transactions originating from one or more POS devices of the plurality of POS devices, wherein the one or more POS devices are associated with a first merchant of the plurality of merchants, the payment processor being part of a payment processor network and in communication with a plurality of point-of-sale (POS) devices each associated with a merchant, wherein the payment processor is configured to process payment card transactions over the payment processor network;
identify, from the one or more payment card transactions, one or more merchant data values associated with the first merchant, wherein the first merchant is not designated to any aggregate merchant of the one or more aggregate merchants based on the one or more merchant data values;
determine each of the one or more merchant data values corresponds to at least one antecedent of a subset of antecedents included in the association rule;
apply the association rule to the one or more merchant data values by comparing the model value for each antecedent with a merchant data value associated with the corresponding antecedent;
generate a confidence score for the first merchant, the confidence score representing a likelihood that the first merchant is associated with the selected aggregate merchant;
assign, in the memory, an affiliation between the first merchant and the selected aggregate merchant based on the confidence score, wherein the affiliation indicates that subsequent payment card transactions originated at the first merchant are attributable to the selected aggregate merchant;
receive, from the payment processor, a subsequent payment card transaction originating from a POS device of the plurality of POS devices, wherein the POS device is associated with the first merchant, and wherein the subsequent payment card transaction includes a merchant identifier associated with the first merchant; and
concurrently with processing of the subsequent payment card transaction by the payment processor:
access the memory to perform a lookup for the affiliation of the first merchant using the merchant identifier;
determine that the first merchant is associated with the selected aggregate merchant based on the affiliation; and
aggregate the subsequent payment card transaction to a plurality of payment card transactions associated with the selected aggregate merchant.

16. The computer-readable storage media of claim 15, wherein the computer-executable instructions further cause the processor to apply the association rule to the plurality of merchants, thereby generating a plurality of confidence scores.

17. The computer-readable storage media of claim 15, wherein applying the association rule further comprises:
generating a plurality of confidence sub-values, each confidence sub-value corresponding to one of the subset of antecedents; and
combining the plurality of confidence sub-values to generate the confidence score.

18. The computer-readable storage media of claim 17, wherein the computer-executable instructions further cause the processor to identify the association rule including the subset of antecedents, each antecedent further including an associated weight.

19. The computer-readable storage media of claim 18, wherein applying the association rule further comprises weighing each sub-value of the plurality of sub-values with the associated weight prior to combining.

20. The computer-readable storage media of claim 18, wherein identifying the association rule further comprises identifying the association rule including the subset of antecedents, each antecedent having a comparison type, and
    wherein applying the association rule comprises comparing the model value for each antecedent with the merchant data value based at least in part on the comparison type.

21. The computer-readable storage media of claim 15, wherein applying the association rule further comprises generating n-gram representations for the model value of an antecedent and a corresponding merchant data value.

* * * * *